US012566885B2

(12) United States Patent
Brannon et al.

(10) Patent No.: US 12,566,885 B2
(45) Date of Patent: Mar. 3, 2026

(54) DATA PROCESSING SYSTEMS AND METHODS FOR AUTOMATICALLY DETECTING TARGET DATA TRANSFERS AND TARGET DATA PROCESSING

(71) Applicant: OneTrust, LLC, Atlanta, GA (US)

(72) Inventors: Jonathan Blake Brannon, Smyrna, GA (US); Patrick Whitney, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 183 days.

(21) Appl. No.: 18/027,217

(22) PCT Filed: Sep. 21, 2021

(86) PCT No.: PCT/US2021/051217
§ 371 (c)(1),
(2) Date: Mar. 20, 2023

(87) PCT Pub. No.: WO2022/061270
PCT Pub. Date: Mar. 24, 2022

(65) Prior Publication Data
US 2023/0334158 A1      Oct. 19, 2023

Related U.S. Application Data

(60) Provisional application No. 63/080,917, filed on Sep. 21, 2020.

(51) Int. Cl.
G06F 21/62 (2013.01)
G06F 21/55 (2013.01)
G06F 21/57 (2013.01)

(52) U.S. Cl.
CPC .......... G06F 21/6245 (2013.01); G06F 21/55 (2013.01); G06F 21/554 (2013.01); G06F 21/577 (2013.01)

(58) Field of Classification Search
CPC .... G06F 21/6245; G06F 21/55; G06F 21/554; G06F 21/577
See application file for complete search history.

(56) References Cited

U.S. PATENT DOCUMENTS 9,183,383 B1 * 11/2015 Yablokov ................ G06F 12/16
11,200,324 B1 * 12/2021 Manral ................. G06F 21/629
(Continued)

FOREIGN PATENT DOCUMENTS

CN       111496802       8/2020
CN       112115859       12/2020
(Continued)

OTHER PUBLICATIONS

Abdullah et al, "The Mapping Process of Unstructured Data to the structured Data", ACM, pp. 151-155 (Year: 2013).
(Continued)

*Primary Examiner* — Linglan Edwards
*Assistant Examiner* — Jacob Benedict Knackstedt
(74) *Attorney, Agent, or Firm* — Ballard Spahr LLP

(57) ABSTRACT

Aspects of the present disclosure provide methods, apparatuses, systems, computing devices, computing entities, and/or the like for protection of system software, or data from destruction, unauthorized modification, and/or unauthorized disclosure securing by, for example, detecting the transfer and/or processing of target data. Accordingly, a method is provided that involves: scanning a software application to identify functionality configured for processing target data; identifying fields associated with the functionality; identifying metadata associated with a field; generating, from the metadata, an identification of a type of data associated with the field; determining a location based on the processing of the target data by the functionality; determining a risk associated with the functionality processing the target data
(Continued)

based on the location and the type of data; determining that the risk satisfies a threshold level of risk; and in response, causing an action to be performed to mitigate the risk.

20 Claims, 8 Drawing Sheets

(56) References Cited

U.S. PATENT DOCUMENTS

| | | | | |
|---|---|---|---|---|
| 2016/0099963 | A1* | 4/2016 | Mahaffey | H04L 63/166 726/25 |
| 2016/0171415 | A1* | 6/2016 | Yampolskiy | H04L 61/4511 705/7.28 |
| 2019/0050596 | A1* | 2/2019 | Barday | H04L 63/1433 |
| 2019/0163341 | A1* | 5/2019 | Jeon | G06F 3/0482 |
| 2019/0364058 | A1* | 11/2019 | Legault | H04L 63/145 |
| 2019/0384899 | A1 | 12/2019 | Brannon | |
| 2020/0125555 | A1* | 4/2020 | Panchaksharaiah | G06F 16/2379 |
| 2020/0257782 | A1 | 8/2020 | Brannon et al. | |

FOREIGN PATENT DOCUMENTS

| | | |
|---|---|---|
| EP | 1394698 | 3/2004 |
| EP | 2031540 | 3/2009 |
| KR | 20130062500 | 6/2013 |
| WO | WO 2001033430 | 5/2001 |
| WO | WO 20020067158 | 8/2002 |
| WO | WO 20030050773 | 6/2003 |
| WO | WO 2005008411 | 1/2005 |
| WO | WO 2007002412 | 1/2007 |
| WO | WO 2008134203 | 11/2008 |
| WO | WO 2012174659 | 12/2012 |
| WO | WO 2015116905 | 8/2015 |
| WO | WO 2020146028 | 7/2020 |
| WO | WO 2022006421 | 1/2022 |

OTHER PUBLICATIONS

Acar, Gun Es, et al, The Web Never Forgets, Computer and Communications Security, ACM, Nov. 3, 2014, pp. 674-689.
Aghasian, Erfan, et al, Scoring Users' Privacy Disclosure Across Multiple Online Social Networks. IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework" IEEE, pp. 659-662 (Year: 2009).
Agrawal et al, "Securing Electronic Health Records Without Impeding the Flow of Information," International Journal of Medical Informatics 76, 2007, pp. 471-479 (Year: 2007).
Ahmad et al, "Task-Oriented Access Model for Secure Data Sharing Over Cloud," ACM, pp. 1-7 (Year: 2015).
Ahmad, et al, "Performance of Resource Management Algorithms for Processable Bulk Data Transfer Tasks in Grid Environments," ACM, pp. 177-188 (Year: 2008).
Alaa et al, "Personalized Risk Scoring for Critical Care Prognosis Using Mixtures of Gaussian Processes," Apr. 27, 2017, IEEE, vol. 65, issue 1, pp. 207-217 (Year: 2017).
Ali et al, "Age Estimation from Facial Images Using Biometric Ratios and Wrinkle Analysis," IEEE, 2015, pp. 1-5 (Year: 2015).
Alkalha et al, "Investigating the Effects of Human Resource Policies on Organizational Performance: An Empirical Study on Commercial Banks Operating in Jordan," European Journal of Economics, Finance and Administrative Science, p. 1-22 (Year: 2012).
Aman et al, "Detecting Data Tampering Attacks in Synchrophasor Networks using Time Hopping, " IEEE, pp. 1-6 (Year: 2016).
Amar et al, "Privacy-Aware Infrastructure for Managing Personal Data," ACM, pp. 571-572, Aug. 22-26, 2016 (Year: 2016).
Antunes et al, "Preserving Digital Data in Heterogeneous Environments", ACM, pp. 345-348, 2009 (Year: 2009).

Ardagna, et al, "A Privacy-Aware Access Control System," Journal of Computer Security, 16:4, pp. 369-397 (Year: 2008).
Avepoint, Automating Privacy Impact Assessments, AvePoint, Inc.
Avepoint, AvePoint Privacy Impact Assessment 1: User Guide, Cumulative Update 2, Revision E, Feb. 2015, AvePoint, Inc.
Avepoint, Installing and Configuring the APIA System, International Association of Privacy Professionals, AvePoint, Inc.
Ball, et al, "Aspects of the Computer-Based Patient Record," Computers in Healthcare, Springer-Verlag New York Inc., pp. 1-23 (Year: 1992).
Banerjee et al, "Link Before You Share: Managing Privacy Policies through Blockchain," IEEE, pp. 4438-4447 (Year: 2017).
Bang et al, "Building an Effective and Efficient Continuous Web Application Security Program," 2016 International Conference on Cyber Security Situational Awareness, Data Analytics and Assessment (CyberSA), London, 2016, pp. 1-4 (Year: 2016).
Bansal et al, "Integrating Big Data: A Semantic Extract-Transform-Load Framework," IEEE, pp. 42-50 (Year: 2015).
Bao et al, "Performance Modeling and Workflow Scheduling of Microservice-Based Applications in Clouds," IEEE Transactions on Parallel and Distributed Systems, vol. 30, No. 9, Sep. 2019, pp. 2101-2116 (Year: 2019).
Barker, "Personalizing Access Control by Generalizing Access Control," ACM, pp. 149-158 (Year: 2010).
Barr, "Amazon Rekognition Update—Estimated Age Range for Faces," AWS News Blog, Feb. 10, 2017, pp. 1-5 (Year: 2017).
Bayardo et al, "Technological Solutions for Protecting Privacy," Computer 36.9 (2003), pp. 115-118, (Year: 2003).
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).
Bertino et al, "Towards Mechanisms for Detection and Prevention of Data Exfiltration by Insiders, " Mar. 22, 2011, ACM, pp. 10-19 (Year: 2011).
Bhargav-Spantze et al, Receipt Management- Transaction History based Trust Establishment, 2007, ACM, p. 82-91.
Bhuvaneswaran et al, "Redundant Parallel Data Transfer Schemes for the Grid Environment", ACM, pp. 18 (Year: 2006).
Bieker, et al, "Privacy-Preserving Authentication Solutions—Best Practices for Implementation and EU Regulatory Perspectives," Oct. 29, 2014, IEEE, pp. 1-10 (Year: 2014).
Bin, et al, "Research on Data Mining Models for the Internet of Things," IEEE, pp. 1-6 (Year: 2010).
Bindschaedler et al, "Privacy Through Fake Yet Semantically Real Traces," Arxiv.Org, Cornell University Library, 201 Olin Library Cornell University Ithaca, NY 14853 May 27, 2015 (Year: 2015).
Binns, et al, "Data Havens, or Privacy Sans Frontières? A Study of International Personal Data Transfers," ACM, pp. 273-274 (Year: 2002).
Bjorn Greif, "Cookie Pop-up Blocker: Cliqz Automatically Denies Consent Requests," Cliqz.com, pp. 1-9, Aug. 11, 2019 (Year: 2019).
Borgida, "Description Logics in Data Management," IEEE Transactions on Knowledge and Data Engineering, vol. 7, No. 5, Oct. 1995, pp. 671-682 (Year: 1995).
Brandt et al, "Efficient Metadata Management in Large Distributed Storage Systems," IEEE, pp. 1-9 (Year: 2003).
Bujlow et al, "Web Tracking: Mechanisms, Implications, and Defenses," Proceedings of the IEEE, Aug. 1, 2017, vol. 5, No. 8, pp. 1476-1510 (Year: 2017).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Carminati et al, "Enforcing Access Control Over Data Streams," ACM, pp. 21-30 (Year: 2007).
Carpineto et al, "Automatic Assessment of Website Compliance to the European Cookie Law with CooLCheck," Proceedings of the 2016 ACM on Workshop on Privacy in the Electronic Society, 2016, pp. 135-138 (Year: 2016).
Castro et al, "Creating Lightweight Ontologies for Dataset Description," IEEE, pp. 1-4 (Year: 2014).

(56)          References Cited

OTHER PUBLICATIONS

Cerpzone, "How to Access Data on Data Archival Storage and Recovery System", https://www.saj.usace.army.mil/Portals/44/docs/Environmental/Lake%200%20Watershed/15February2017/How%20To%20Access%20Model%20Data%20on%20DASR.pdf?ver=2017-02-16-095535-633, Feb. 16, 2017.
Cha et al, "A Data-Driven Security Risk Assessment Scheme for Personal Data Protection," IEEE, pp. 50510-50517 (Year: 2018).
Cha, et al, "Process-Oriented Approach for Validating Asset Value for Evaluating Information Security Risk," IEEE, Aug. 31, 2009, pp. 379-385 (Year: 2009).
Chang et al, "A Ranking Approach for Human Age Estimation Based on Face Images," IEEE, 2010, p. 3396-3399 [Year: 2010).
Chapados et al, "Scoring Models for Insurance Risk Sharing Pool Optimization," IEEE, pp. 97-105 (Year: 2008).
Cheng, Raymond, et al, "Radiatus: A Shared-Nothing Server-Side Web Architecture," Proceedings of the Seventh ACM Symposium on Cloud Computing, Oct. 5, 2016, pp. 237-250 (Year: 2016).
Choi et al, "Retrieval Effectiveness of Table of Contents and Subject Headings," ACM, pp. 103-104 (Year: 2007).
Choi et al, A "Survey on Ontology Mapping," ACM, p. 34-41 (Year. 2006).
Chowdhury et al, "A System Architecture for Subject-Centric Data Sharing", ACM, pp. 1-10 (Year: 2018).
Chowdhury et al, "Managing Data Transfers in Computer Clusters with Orchestra," ACM, pp. 98-109 (Year: 2011).
Civili et al, "Mastro Studio: Managing Ontology-Based Data Access Applications," ACM, pp. 1314-1317, Aug. 26-30, 2013 (Year: 2013).
Cruz et al, "Interactive User Feedback in Ontology Matching Using Signature Vectors," IEEE, p. 1321-1324 (Year: 2012.
Cudre-Mauroux, "ESWC 2008 Ph.D. Symposium," The ESWC 2008 Ph.D. Symposium is sponsored by the Okkam project (http://fp7.okkam.org/), MIT, p. 1-92 (Year: 2008).
Cui et al., "Domain Ontology Management Environment," IEEE, pp. 1-9 (Year: 2000).
Czeskis et al, "Lightweight Server Support for Browser-based CSRF Protection," Proceedings of the 22nd International Conference on World Wide Web, 2013, pp. 273-284(Year: 2013).
Degeling et al, "We Value Your Privacy . . . Now Take Some Cookies: Measuring the GDPRs Impact on Web Privacy," ARXIV. ORG, Cornell University Library, 201 Olin Library Cornell University, Ithaca, NY 14853, Aug. 15, 2018, pp. 1-15 (Year: 2019).
Dimou et al, "Machine-Interpretable Dataset and Service Descriptions for Heterogeneous Data Access and Retrieval", ACM, pp. 145-152 (Year: 2015).
Dokholyan et al, "Regulatory and Ethical Considerations for Linking Clinical and Administrative Databases," American Heart Journal 157.6 (2009), pp. 971-982 (Year: 2009).
Dowling, "Auditing Global HR Compliance", published May 23, 2014, retrieved from https://www.shrm.org/resourcesandtools/hr-topics/global-hr/pages/auditing-global-hr-compliance.aspx Jul. 2, 2022.
Dunkel et al, "Data Organization and Access for Efficient Data Mining", IEEE, pp. 522-529 (Year: 1999).
Dwork, Cynthia, Differential Privacy, Microsoft Research, p. 1-12.
Edinger et al, "Age and Gender Estimation of Unfiltered Faces," IEEE, 2014, p. 2170-2179 (Year: 2014).
Emerson, et al, "A Data Mining Driven Risk Profiling Method for Road Asset Management," ACM, pp. 1267-1275 (Year: 2013).
ESWC 2008 Ph.D. Symposium, Tenerife, Spain retrieved from https://ceur-ws.org/Vol-358/ on Jun. 7, 2023.
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Everypixel Team, "A New Age Recognition API Detects the Age of People on Photos, " May 20, 2019, pp. 1-5 (Year: 2019).

Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
Falbo et al, "An Ontological Approach to Domain Engineering," ACM, p. 351-358 (Year: 2002).
Fan et al, "Intrusion Investigations with Data-hiding for Computer Log-file Forensics," IEEE, pp. 1-6 (Year: 2010).
Francis, Andre, Business Mathematics and Statistics, South-Western Cengage Learning, 2008, Sixth Edition.
Friedman et al, "Data Mining with Differential Privacy," ACM, Jul. 2010, pp. 493-502 (Year: 2010).
Friedman et al, "Informed consent in the Mozilla Browser: Implementing Value- Sensitive Design," Proceedings of the 35th Annual Hawaii International conference on System Sciences, 2002, IEEE, pp. 1-10 (Year: 2002).
Frikken, Keith B., et al, Yet Another Privacy Mebic for Publishing Micro-data, Miami University, Oct. 27, 2008, p. 117-121.
Fung et al, "Discover Information and Knowledge from Websites using an Integrated Summarization and Visualization Framework" IEEE, pp. 232-235 (Year: 2010).
Gajare et al, Improved Automatic Feature Selection Approach for Health Risk Prediction, Feb. 16, 2018, IEEE, pp. 816-819 (Year: 2018).
Geko et al, "An Ontology Capturing the Interdependence of the General Data Protection Regulation (GDPR) and Information Security," ACM, pp. 1-6, Nov. 15-16, 2018 (Year: 2018).
Ghiglieri, Marco et al, Personal OLP for Facebook, 2014 IEEE International Conference on Pervasive Computing and Communication Workshops (Percom Workshops); IEEE; Mar. 24, 2014; pp. 629-634.
Gilda, et al, "Blockchain for Student Data Privacy and Consent," 2018 International Conference on Computer Communication and Informatics, Jan. 4-6, 2018, IEEE, pp. 1-5 (Year: 2018).
Golab, et al, "Issues in Data Stream Management," ACM, SIGMOD Record, vol. 32, No. 2, Jun. 2003, pp. 5-14 (Year: 2003).
Golfarelli et al, "Beyond Data Warehousing: What's Next in Business Intelligence?," ACM, pp. 1-6 (Year: 2004).
Goncalves et al, "The XML Log Standard for Digital Libraries: Analysis, Evolution, and Deployment," IEEE, pp. 312-314 (Year: 2003).
Goni, Kyriaki, "Deletion Process Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Gowadia et al, "RDF Metadata for XML Access Control," ACM, pp. 31-48 (Year: 2003).
Grolinger et al, "Data Management in Cloud Environments: NoSQL and NewSQL Data Stores," Journal of Cloud Computing: Advances, Systems and Applications, pp. 1-24 (Year: 2013).
Guo, et al, "Opal: A Passe-partout for Web Forms," ACM, pp. 353-356 (Year: 2012).
Gustarini, et al, "Evaluation of Challenges in Human Subject Studies "In-the-Wild" Using Subjects' Personal Smartphones," ACM, pp. 1447-1456 (Year: 2013).
Hacigümüs, Hakan, et al., Executing SQL over Encrypted Data in the Database-Service-Provider Model, ACM, Jun. 4, 2002, pp. 216-227.
Halevy, et al, "Schema Mediation in Peer Data Management Systems," IEEE, Proceedings of the 19th International Conference on Data Engineering, 2003, pp. 505-516 (Year: 2003).
Han et al, "Demographic Estimation from Face Images: Human vs. Machine Performance, " IEEE, 2015, p. 1148-1161 (Year: 2015).
Hauch, et al, "Information Intelligence: Metadata for Information Discovery, Access, and Integration," ACM, pp. 793-798 (Year: 2005).
He et al, "A Crowdsourcing Framework for Detecting of Cross-Browser Issues in Web Application," ACM, pp. 1-4, Nov. 6, 2015 (Year: 2015).
Heil et al, "Downsizing and Rightsizing", archived May 23, 2013, retrieved from https://web.archive.org/web/20130523153311/https://

(56)           References Cited

OTHER PUBLICATIONS www.referenceforbusiness.com/man agement/De-Ele/Downsizing-and-Rightsizing.html Jun. 7, 2023.

Hernandez, et al, "Data Exchange with Data-Metadata Translations," ACM, pp. 260-273 (Year: 2008).

Hinde, "A Model to Assess Organisational Information Privacy Maturity Against the Protection of Personal Information Act" Dissertation University of Cape Town 2014, pp. 1-121 (Year: 2014).

Hodge, et al, "Managing Virtual Data Marts with Metapointer Tables," pp. 1-7 (Year: 2002).

Horrall et al, "Evaluating Risk: IBM's Country Financial Risk and Treasury Risk Scorecards," Jul. 21, 2014, IBM, vol. 58, issue 4, p. 2:1-2:9 (Year: 2014).

Hu, et al, "Attribute Considerations for Access Control Systems," NIST Special Publication 800-205, Jun. 2019, pp. 1-42 (Year: 2019).

Hu, et al, "Guide to Attribute Based Access Control (ABAC) Definition and Considerations (Draft)," NIST Special Publication 800-162, pp. 1-54 (Year: 2013).

Huang, et al, "A study on Information Security Management with Personal Data Protection," IEEE, Dec. 9, 2011, pp. 624-630 (Year: 2011).

Huettner, Digital Risk Management: Protecting Your Privacy, Improving Security, and Preparing for Emergencies, EEE, pp. 136-138 (Year: 2006).

Huner et al, "Towards a Maturity Model for Corporate Data Quality Management", ACM, pp. 231-238, 2009 (Year: 2009).

Hunton & Williams LLP, The Role of Risk Management in Data Protection, Privacy Risk Framework and the Risk-based Approach to Privacy, Centre for Information Policy Leadership, Workshop II, Nov. 23, 2014.

Huo et al, "A Cloud Storage Architecture Model for Data-Intensive Applications," IEEE, pp. 1-4 (Year: 2011).

IAPP, Daily Dashboard, PIA Tool Stocked With New Templates for DPI, Infosec, International Association of Privacy Professionals, Apr. 22, 2014.

IAPP, ISO/IEC 27001 Information Security Management Template, Resource Center, International Association of Privacy Professionals.

Imran et al, "Searching in Cloud Object Storage by Using a Metadata Model", IEEE, 2014, retrieved online on Apr. 1, 2020, pp. 121-128. Retrieved from the Internet: URL: https:llieeeexplore.ieee.org/stamp/stamp.jsp? (Year: 2014).

Iordanou et al, "Tracing Cross Border Web Tracking," Oct. 31, 2018, pp. 329-342, ACM (Year: 2018).

Islam, et al, "Mixture Model Based Label Association Techniques for Web Accessibility," ACM, pp. 67-76 (Year: 2010).

Jayasinghe et al, "Matching Facial Images Using Age Related Morphing Changes," ISSRI, 2009, pp. 2901-2907 [Year: 2009).

Jensen, et al, "Temporal Data Management," IEEE Transactions on Knowledge and Data Engineering, vol. 11, No. 1, Jan./Feb. 1999, pp. 36-44 (Year: 1999).

Jiahao Chen et al. "Fairness Under Unawareness: Assessing Disparity when Protected Class is Unobserved," arxiv.org, Cornell University Library, 201 Olin Library Cornell University, Ithaca, NY 14853, Nov. 27, 2018 (Nov. 27, 2018), Section 2, Figure2. (Year 2018).

Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).

Jones et al, "AI and the Ethics of Automating Consent," IEEE, pp. 64-72, May 2018 (Year: 2018).

Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.prg/10.1145/3200000/3196462/p78-joonbakhsh.pdf? (Year: 2018).

Jun et al, "Scalable Multi-Access Flash Store for Big Data Analytics," ACM, pp. 55-64 (Year: 2014).

Khan et al, "Wrinkles Energy Based Age Estimation Using Discrete Cosine Transform," IEEE, 2015, p. 1-4 (Year: 2015).

Kirkham, et al, "A Personal Data Store for an Internet of Subjects," IEEE, pp. 92-97 (Year: 2011 ).

Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.

Kristian et al, "Human Facial Age Classification Using Active Shape Module, Geometrical Feature, and Support Vendor Machine on Early Growth Stage," ISICO, 2015, p. 1-8 (Year. 2015).

Krol, Kat, et al, Control versus Effort in Privacy Warnings for Webforms, ACM, Oct. 24, 2016, pp. 13-23.

Lamb et al, "Role-Based Access Control for Data Service Integration", ACM, pp. 3-11 {Year: 2006).

Lasierra et al, "Data Management in Home Scenarios Using an Autonomic Ontology-Based Approach," IEEE, pp. 94-99 (Year: 2012).

Leadbetter, et al, "Where Big Data Meets Linked Data: Applying Standard Data Models to Environmental Data Streams," IEEE, pp. 2929-2937 (Year: 2016).

Lebeau, Franck, et al, "Model-Based Vulnerability Testing for Web Applications," 2013 IEEE Sixth International Conference on Software Testing, Verification and Validation Workshops, pp. 445-452, IEEE, 2013 (Year: 2013).

Lenzerini et al, "Ontology-based Data Management," ACM, pp. 5-6 (Year: 2011).

Lewis, James et al, "Microservices," Mar. 25, 2014 (Mar. 25, 2014), XP055907494, Retrieved from the Internet: https:// martinfowler.com/articles/microservices.html. (retrieved on Mar. 31, 2022].

Li, Ninghui, et al, t-Closeness: Privacy Beyond k-Anonymity and I-Diversity, IEEE, 2014, pp. 106-115.

Liu et al, "A Novel Approach for Detecting Browser-based Silent Miner," IEEE, pp. 490-497 (Year: 2018).

Liu et al, "Cross-Geography Scientific Data Transferring Trends and Behavior," ACM, pp. 267-278 (Year: 2018).

Liu et al, "Overview on Ontology Mapping and Approach," IEEE, p. 592-595 (Year: 2011).

Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.

Liu, Yandong, et al, "Finding the Right Consumer: Optimizing for Conversion in Display Advertising Campaigns," Proceedings of the Fifth ACM International Conference on Web Search and Data Mining, Feb. 2, 2012, pp. 473-428 (Year: 2012).

Lizar et al, "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).

Lu et al, "An HTTP Flooding Detection Method Based on Browser Behavior," IEEE, pp. 1151-1154 (Year: 2006).

Lu, "How Machine Learning Mitigates Racial Bias in the US Housing Market," Available as SSRN 3489519, pp. 1-73, Nov. 2019 (Year: 2019).

Luu, et al, "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).

Ma Ziang, et al, "LibRadar: Fast and Accurate Detection of Third-Party Libraries in Android Apps," 2016 IEEE/ACM 38th IEEE International Conference on Software Engineering Companion (ICSE-C), ACM, May 14, 2016, pp. 653-656, DOI: http:1/dx.doi.org/10.1145/2889160.2889178, p. 653, r.col, par. 1-3; figure 3 (Year: 2016).

Mandal, et al, "Automated Age Prediction Using Wrinkles Features of Facial Images and Neural Network," International Journal of Emerging Engineering Research and Technology, vol. 5, Issue 2, Feb. 2017, pp. 12-20 Year: 2017).

Maret et al, "Multimedia Information Interchange: Web Forms Meet Data Servers", IEEE, pp. 499-505 (Year: 1999).

(56)        References Cited

OTHER PUBLICATIONS

Martin, et al, "Hidden Surveillance by Web Sites: Web Bugs in Contemporary Use," Communications of the ACM, vol. 46, No. 12, Dec. 2003, pp. 258-264. Internet source https://doi.org/10.1145/953460.953509. (Year: 2003).

Matte et al, "Do Cookie Banners Respect my Choice?: Measuring Legal Compliance of Banners from IAB Europe's Transparency and Consent Framework," 2020IEEE Symposium on Security and Privacy (SP), 2020, pp. 791-809 Year: 2020).

McGarth et al, "Digital Library Technology for Locating and Accessing Scientific Data", ACM, pp. 188-194 (Year: 1999).

Mesbah et al, "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).

Milic et al, "Comparative Analysis of Metadata Models on e-Government Open Data Platforms," IEEE, p. 119-130 Year: 2021).

Moiso et al, "Towards a User-Centric Personal Data Ecosystem the Role of the Bank of Individual's Data," 2012 16th International Conference on Intelligence in Next Generation Networks, Berlin, 2012, pp. 202-209 (Year: 2012).

Moscoso-Zea et al, "Datawarehouse Design for Educational Data Mining," IEEE, pp. 1-6 (Year: 2016).

Mudepalli et al, "An efficient data retrieval approach using blowfish encryption on cloud CipherText Retrieval in Cloud Computing" IEEE, pp. 267-271 (Year: 2017).

Mundada et al, "Half-Baked Cookies: Hardening Cookie-Based Authentication for the Modem Web," Proceedings of the 11th ACM on Asia Conference on Computer and Communications Security, 2016, pp. 675-685 (Year: 2016).

Nemec et al, "Assessment of Query Execution Performance Using Selected Business Intelligence Tools and Experimental Agile Oriented Data Modeling Approach," Sep. 16, 2015, IEEE, p. 1327-1333. (Year: 2015).

Newman et al, "High Speed Scientific Data Transfers using Software Defined Networking," ACM, pp. 1-9 (Year: 2015).

Newman, "Email Archive Overviews using Subject Indexes", ACM, pp. 652-653, 2002 (Year: 2002).

Nishikawa, Taiji, English Translation of JP 2019154505, Aug. 27, 2019 (Year: 2019).

Niu, et al, "Achieving Data Truthfulness and Privacy Preservation in Data Markets", IEEE Transactions On Knowledge and Data Engineering, IE Service Centre, Los Alamitos, CA, US, vol. 31, No. 1, Jan. 1, 2019, pp. 105-119 (Year 2019).

Nouwens et al, "Dark Patterns after the GDPR: Scraping Consent Pop-ups and Demonstrating their Influence," ACM, pp. 1-13, Apr. 25, 2020 (Year: 2020).

NPL Search Terms (Year: 2021).

O'Keefe et al, "Privacy-Preserving Data Linkage Protocols," Proceedings of the 2004 ACM Workshop on Privacy in the Electronic Society, 2004, pp. 94-102 (Year: 2004).

Olenski, Steve, For Consumers, Data Is a Matter of Trust, GMO Network, Apr. 18, 2016, https://www.forbes.com/sites/steveolenski/2016/04/18/for-consumers-data-is-a-matter-of-trust/#2e48496278b3.

Ozdikis et al, "Tool Support for Transformation from an OWL Ontology to an HLA Object Model," ACM, pp. 1-6 (Year: 2010).

Paes, "Student Research Abstract: Automatic Detection of Cross-Browser Incompatibilities using Machine Learning 1md Screenshot Similarity," ACM, pp. 697-698, Apr. 3, 2017 (Year: 2017).

Pearson, et al, "A Model-Based Privacy Compliance Checker," IJEBR, vol. 5, No. 2, pp. 63-83, 2009, Nov. 21, 2008. [Online]. Available: http://dx.doi.org/10.4018jebr.2009040104 (Year: 2008).

Pechenizkiy et al, "Process Mining Online Assessment Data," Educational Data Mining, pp. 279-288 (Year: 2009).

Petrie et al, "The Relationship between Accessibility and Usability of Websites", ACM, pp. 397-406 (Year: 2007).

Pfeifle, Sam, The Privacy Advisor, IAPP and AvePoint Launch New Free PIA Tool, International Association of Privacy Professionals, Mar. 5, 2014.

Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, pp. 1-3.

Ping et al, "Wide Area Placement of Data Replicas for Fast and Highly Available Data Access," ACM, pp. 1-8 (Year: 2011 ).

Popescu-Zeletin, "The Data Access and Transfer Support in a Local Heterogeneous Network (HMINET)", IEEE, pp. 147-152 (Year: 1979).

Porter, "De-Identified Data and Third Party Data Mining: The Risk of Re-Identification of Personal Information," Shidler JL Com. & Tech. 5, 2008, pp. 1-9 (Year: 2008).

Pretorius, et al, "Attributing Users Based on Web Browser History," 2017 IEEE Conference on Application, Information and Network Security (AINS), 2017, pp. 69-74 (Year: 2017).

Preuveneers et al, "Access Control with Delegated Authorization Policy Evaluation for Data-Driven Microservice Workflows," Future Internet 2017, MDPI, p. 1-21 (Year: 2017).

Qing-Jiang et al, "The (P a, K) Anonymity Model for Privacy Protection of Personal Information in the Social Networks," 2011 6th IEEE Joint International Information Technology and Artificial Intelligence Conference, vol. IEEE, 2011, pp. 420-423 (Year: 2011).

Qiu, et al, "Design and Application of Data Integration Platform Based on Web Services and XML," IEEE, pp. 253-256 Year: 2016).

Qu et al, "Metadata Type System: Integrate Presentation, Data Models and Extraction to Enable Exploratory Browsing Interfaces," ACM, pp. 107-116 (Year: 2014).

Radu, et al, "Analyzing Risk Evaluation Frameworks and Risk Assessment Methods," IEEE, Dec. 12, 2020, pp. 1-6 (Year: 2020).

Rakers, "Managing Professional and Personal Sensitive Information," ACM, pp. 9-13, Oct. 24-27, 2010 (Year: 2010).

Reardon et al, User-Level Secure Deletion on Log-Structured File Systems, ACM, 2012, retrieved online on Apr. 22, 2021, pp. 1-11. Retrieved from the Internet URL: http://citeseerx.ist.psu.edu/viewdoc/download;sessionid=450713515DC7F19F8ED09AE961D4860E. (Year: 2012).

Regulation (EU) 2016/679, On the protection of natural persons with regard to the processing of personal data and on the free movement of such data, and repealing Directive 95/46/EC {General Data Protection Regulation); Official Journal of the European Union, May 4, 2016, pp. L 119/1-L 119/88 (Year: 2016).

Roesner et al, Detecting and Defending Against Third-Party Tracking on the Web, 9th USENIX Symposium on Networked Systems Design and Implementation, Apr. 11, 2013, pp. 1-14, ACM (Year: 2013).

Rozepz, "What is Google Privacy Checkup? Everything You Need to Know," Tom's Guide web post, Apr. 26, 2018, pp. 1-11 {Year: 2018).

Sachinopoulou et al, "Ontology-Based Approach for Managing Personal Health and Wellness Information," IEEE, pp. 1802-1805 (Year: 2007).

Salim et al, "Data Retrieval and Security using Lightweight Directory Access Protocol", IEEE, pp. 685-688 (Year: 2009).

Sanchez-Rola et al, "Can I Opt Out Yet?: GDPR and the Global Illusion of Cookie Control," Proceedings of the 2019 ACM Asia Conference on Computer and Communications Security, 2019, pp. 340-351 (Year: 2019).

Santhisree, et al, Web Usage Data Clustering Using Dbscan Algorithm and Set Similarities, IEEE, pp. 220-224 (Year: 2010).

Sanzo et al, "Analytical Modeling of Lock-Based Concurrency Control with Arbitrary Transaction Data Access Patterns," ACM, pp. 69-78 (Year: 2010).

Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, pp. 317-331.

Sedinic et al, "Security Risk Management in Complex Organization," May 29, 2015, IEEE, pp. 1331-1337 (Year: 2015).

Shahriar et al, "A Model-Based Detection of Vulnerable and Malicious Browser Extensions," IEEE, pp. 198-207 Year: 2013).

Shankar et al, "Doppleganger: Better Browser Privacy Without the Bother," Proceedings of the 13th ACM Conference on Computer

(56)        References Cited

OTHER PUBLICATIONS and Communications Security; [ACM Conference on Computer and Communications Security], New York, NY: ACM, US, Oct. 30, 2006, pp. 154-167 (Year: 2006).

Shulz et al, "Generative Data Models for Validation and Evaluation of Visualization Techniques," ACM, p. 1-13 Year: 2016).

Singh, et al, "A Metadata Catalog Service for Data Intensive Applications," ACM, pp. 1-17 (Year: 2003).

Sjosten et al, "Discovering Browser Extensions via Web Accessible Resources," ACM, pp. 329-336, Mar. 22, 2011 (Year: 2017).

Slezak, et al, "Brighthouse: An Analytic Data Warehouse for Ad-hoc Queries," ACM, pp. 1337-1345 (Year: 2008).

Soceanu, et al, "Managing the Privacy and Security of eHealth Data," May 29, 2015, IEEE, pp. 1-8 (Year: 2015).

Srinivasan et al, "Descriptive Data Analysis of File Transfer Data," ACM, pp. 1-8 (Year: 2014).

Srivastava, Agrima, et al, Measuring Privacy Leaks in Online Social Networks, International Conference on Advances in Computing, Communications and Informatics (ICACCI), 2013.

Stack Overflow, "Is there a way to force a user to scroll to the bottom of a div?," Stack Overflow, pp. 1-11, Nov. 2013. [Online]. Available: https://stackoverflow.com/questions/27 45935/is-there-a-way-to-force-a-user-to-scroll-to-the-bottom-of-a-div (Year: 2013).

Stern, Joanna, "iPhone Privacy Is Broken . . . and Apps Are to Blame", The Wall Street Journal, wsj.com, May 31, 2019.

Strodl, et al, "Personal & SOHO Archiving," Vienna University of Technology, Vienna, Austria, JCDL '08, Jun. 16-20, 2008, Pittsburgh, Pennsylvania, USA, pp. 115-123 (Year: 2008).

Sukumar et al, "Review on Modem Data Preprocessing Techniques in Web Usage Mining (WUM)," IEEE, 2016, pp. 64-69 (Year: 2016).

Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.

Tanasa et al, "Advanced Data Preprocessing for Intersites Web Usage Mining," IEEE, Mar. 2004, pp. 59-65 (Year: 2004).

Tanwar, et al, "Live Forensics Analysis: Violations of Business Security Policy," 2014 International Conference on Contemporary Computing and Informatics (IC31), 2014, pp. 971-976 (Year: 2014).

The Cookie Collective, Optanon Cookie Policy Generator, The Cookie Collective, Year 2016, http://web.archive.prg/web/201603240627 43/https:/optanon.com/.

Thomas et al, "MooM—A Prototype Framework for Management of Ontology Mappings," IEEE, pp. 548-555 (Year: 2011).

Thuraisingham, "Security Issues for the Semantic Web," Proceedings 27th Annual International Computer Software and Applications Conference, COMPSAC 2003, Dallas, TX, USA, 2003, pp. 633-638 {Year: 2003).

TRUSTe Announces General Availability of Assessment Manager for Enterprises to Streamline Data Privacy Management with Automation, PRNewswire, Mar. 4, 2015.

Tsai et al, "Determinants of Intangible Assets Value: The Data Mining Approach," Knowledge Based System, pp. 67-77 http://www_elsevier.com/locate/knosys (Year: 2012).

Tuomas Aura et al, Scanning Electronic Documents for Personally Identifiable Information, ACM, Oct. 30, 2006, retrieved online on Jun. 13, 2019, pp. 41-49. Retrieved from the Internet URL: http://delivery.acm_prg/10_1 145/1180000/1179608/p41-aura_pd (Year: 2006).

Van Eijk et al, "The Impact of User Location on Cookie Notices (Inside and Outside of the European Union," IEEE Security & Privacy Workshop on Technology and Consumer Protection (CONPRO '19), Jan. 1, 2019 (Year: 2019).

Vukovic et al, "Managing Enterprise TI Systems Using Online Communities, " Jul. 9, 2011, IEEE, p. 552-559. (Year: 2011).

Wang et al, "Revealing Key Non-Financial Factors for Online Credit-Scoring in E-Financing," 2013, IEEE, pp. 1-6 (Year: 2013).

Wang et al, "Secure and Efficient Access to Outsourced Data," ACM, pp. 55-65 (Year: 2009).

Weaver et al, "Understanding Information Preview in Mobile Email Processing", ACM, pp. 303-312, 2011 (Year: 2011 ).

Wong et al, "Ontology Mapping for the Interoperability Problem in Network Management," IEEE, pp. 2058-2068 (Year: 2005).

Wu et al, "Data Mining with Big Data," IEEE, Jan. 2014, pp. 97-107, vol. 26, No. 1, (Year: 2014).

www.truste.com (1), 200150207, Internet Archive Wayback Machine, www.archive.org,2_7_2015.

Xu, et al, "GatorShare: A File System Framework for High-Throughput Data Management," ACM, pp. 776-786 (Year: 2010).

Yang et al, "DAG-MACS: Effective Data Access Control for Multiauthority Cloud Storage Systems," IEEE, pp. 1790-1801 (Year: 2013).

Yang et al, "Mining Web Access Sequence with Improved Apriori Algorithm," IEEE, 2017, pp. 780-784 (Year: 2017).

Ye et al, "An Evolution-Based Cache Scheme for Scalable Mobile Data Access," ACM, pp. 1-7 (Year: 2007).

Yue et al, "An Automatic HTTP Cookie Management System," Computer Networks, Elsevier, Amsterdam, NL, vol. 54, No. 13, Sep. 15, 2010, pp. 2182-2198 (Year: 2010).

Advisory Action, dated Jan. 13, 2021, from corresponding U.S. Appl. No. 16/808,493.

Advisory Action, dated Jan. 13, 2021, from corresponding U.S. Appl. No. 16/862,944.

Advisory Action, dated Jan. 13, 2021, from corresponding U.S. Appl. No. 16/862,948.

Advisory Action, dated Jan. 13, 2021, from corresponding U.S. Appl. No. 16/862,952.

Advisory Action, dated Jan. 6, 2021, from corresponding U.S. Appl. No. 16/808,497.

Advisory Action, dated Jun. 19, 2020, from corresponding U.S. Appl. No. 16/595,342.

Advisory Action, dated Jun. 2, 2020, from corresponding U.S. Appl. No. 16/404,491.

Advisory Action, dated May 21, 2020, from corresponding U.S. Appl. No. 16/557,392.

Decision Regarding Institution of Post-Grant Review in Case PGR2018-00056 for U.S. Pat. No. 9,691,090 B1, Oct. 11, 2018.

Final Office Action, dated Apr. 1, 2022, from corresponding U.S. Appl. No. 17/370,650.

Final Office Action, dated Apr. 23, 2020, from corresponding U.S. Appl. No. 16/572,347.

Final Office Action, dated Apr. 25, 2022, from corresponding U.S. Appl. No. 17/149,421.

Final Office Action, dated Apr. 27, 2021, from corresponding U.S. Appl. No. 17/068,454.

Final Office Action, dated Apr. 28, 2022, from corresponding U.S. Appl. No. 16/925,550.

Final Office Action, dated Apr. 5, 2022, from corresponding U.S. Appl. No. 17/013,756.

Final Office Action, dated Apr. 7, 2020, from corresponding U.S. Appl. No. 16/595,327.

Final Office Action, dated Aug. 10, 2020, from corresponding U.S. Appl. No. 16/791,589.

Final Office Action, dated Aug. 27, 2021, from corresponding U.S. Appl. No. 17/161,159.

Final Office Action, dated Aug. 28, 2020, from corresponding U.S. Appl. No. 16/410,336.

Final Office Action, dated Aug. 5, 2020, from corresponding U.S. Appl. No. 16/719,071.

Final Office Action, dated Aug. 9, 2021, from corresponding U.S. Appl. No. 17/119,080.

Final Office Action, dated Dec. 10, 2021, from corresponding U.S. Appl. No. 17/187,329.

Final Office Action, dated Dec. 7, 2020, from corresponding U.S. Appl. No. 16/862,956.

Final Office Action, dated Dec. 9, 2019, from corresponding U.S. Appl. No. 16/410,336.

Final Office Action, dated Feb. 19, 2020, from corresponding U.S. Appl. No. 16/404,491.

Final Office Action, dated Feb. 25, 2022, from corresponding U.S. Appl. No. 17/346,586.

(56)     References Cited

OTHER PUBLICATIONS

Final Office Action, dated Feb. 3, 2020, from corresponding U.S. Appl. No. 16/557,392.
Final Office Action, dated Feb. 8, 2021, from corresponding U.S. Appl. No. 16/927,658.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Jul. 1, 2022, from corresponding U.S. Appl. No. 17/187,329.
Final Office Action, dated Jul. 21, 2021, from corresponding U.S. Appl. No. 17/151,334.
Final Office Action, dated Jul. 6, 2022, from corresponding U.S. Appl. No. 17/200,698.
Final Office Action, dated Jul. 7, 2021, from corresponding U.S. Appl. No. 17/149,421.
Final Office Action, dated Jun. 10, 2022, from corresponding U.S. Appl. No. 17/161,159.
Final Office Action, dated Jun. 29, 2022, from corresponding U.S. Appl. No. 17/020,275.
Final Office Action, dated Jun. 9, 2022, from corresponding U.S. Appl. No. 17/494,220.
Final Office Action, dated Mar. 21, 2022, from corresponding U.S. Appl. No. 17/373,444.
Final Office Action, dated Mar. 22, 2022, from corresponding U.S. Appl. No. 17/380,485.
Final Office Action, dated Mar. 26, 2021, from corresponding U.S. Appl. No. 17/020,275.
Final Office Action, dated Mar. 5, 2019, from corresponding U.S. Appl. No. 16/055,961.
Final Office Action, dated Mar. 6, 2020, from corresponding U.S. Appl. No. 16/595,342.
Final Office Action, dated May 12, 2022, from corresponding U.S. Appl. No. 17/499,624.
Final Office Action, dated May 14, 2021, from corresponding U.S. Appl. No. 17/013,756.
Final Office Action, dated May 2, 2022, from corresponding U.S. Appl. No. 17/499,595.
Final Office Action, dated May 24, 2022, from corresponding U.S. Appl. No. 17/499,582.
Final Office Action, dated Nov. 29, 2017, from corresponding U.S. Appl. No. 15/619,237.
Final Office Action, dated Oct. 26, 2021, from corresponding U.S. Appl. No. 17/306,496.
Final Office Action, dated Oct. 28, 2021, from corresponding U.S. Appl. No. 17/234,205.
Final Office Action, dated Oct. 29, 2021, from corresponding U.S. Appl. No. 17/020,275.
Final Office Action, dated Sep. 17, 2021, from corresponding U.S. Appl. No. 17/200,698.
Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.
Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 25, 2019, from corresponding U.S. Appl. No. 16/278,119.
Final Office Action, dated Sep. 28, 2020, from corresponding U.S. Appl. No. 16/565,395.
Final Office Action, dated Sep. 8, 2020, from corresponding U.S. Appl. No. 16/410,866.
Final Written Decision Regarding Post-Grant Review in Case PGR2018-00056 for U.S. Pat. No. 9,691,090 B1, Oct. 10, 2019.
Notice of Allowance, dated Apr. 12, 2017, from corresponding U.S. Appl. No. 15/256,419.
Notice of Allowance, dated Apr. 12, 2022, from corresponding U.S. Appl. No. 17/479,807.
Notice of Allowance, dated Apr. 14, 2022, from corresponding U.S. Appl. No. 17/572,276.
Notice of Allowance, dated Apr. 17, 2020, from corresponding U.S. Appl. No. 16/593,639.
Notice of Allowance, dated Apr. 19, 2021, from corresponding U.S. Appl. No. 17/164,029.
Notice of Allowance, dated Apr. 2, 2019, from corresponding U.S. Appl. No. 16/160,577.
Notice of Allowance, dated Apr. 2, 2021, from corresponding U.S. Appl. No. 17/162,006.
Notice of Allowance, dated Apr. 20, 2022, from corresponding U.S. Appl. No. 17/573,808.
Notice of Allowance, dated Apr. 22, 2021, from corresponding U.S. Appl. No. 17/163,701.
Notice of Allowance, dated Apr. 25, 2018, from corresponding U.S. Appl. No. 15/883,041.
Notice of Allowance, dated Apr. 27, 2022, from corresponding U.S. Appl. No. 17/573,999.
Notice of Allowance, dated Apr. 28, 2021, from corresponding U.S. Appl. No. 17/135,445.
Notice of Allowance, dated Apr. 28, 2021, from corresponding U.S. Appl. No. 17/181,828.
Notice of Allowance, dated Apr. 28, 2022, from corresponding U.S. Appl. No. 17/592,922.
Notice of Allowance, dated Apr. 28, 2022, from corresponding U.S. Appl. No. 17/670,352.
Notice of Allowance, dated Apr. 29, 2020, from corresponding U.S. Appl. No. 16/700,049.
Notice of Allowance, dated Apr. 29, 2022, from corresponding U.S. Appl. No. 17/387,421.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 30, 2021, from corresponding U.S. Appl. No. 16/410,762.
Notice of Allowance, dated Apr. 4, 2022, from corresponding U.S. Appl. No. 17/493,332.
Notice of Allowance, dated Apr. 4, 2022, from corresponding U.S. Appl. No. 17/572,298.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 12, 2021, from corresponding U.S. Appl. No. 16/881,832.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.

(56) References Cited

OTHER PUBLICATIONS

Notice of Allowance, dated Aug. 26, 2020, from corresponding U.S. Appl. No. 16/808,503.

Notice of Allowance, dated Aug. 28, 2019, from corresponding U.S. Appl. No. 16/278,120.

Notice of Allowance, dated Aug. 3, 2022, from corresponding U.S. Appl. No. 17/668,714.

Notice of Allowance, dated Aug. 30, 2018, from corresponding U.S. Appl. No. 15/996,208.

Notice of Allowance, dated Aug. 31, 2021, from corresponding U.S. Appl. No. 17/326,901.

Notice of Allowance, dated Aug. 4, 2021, from corresponding U.S. Appl. No. 16/895,278.

Notice of Allowance, dated Aug. 4, 2022, from corresponding U.S. Appl. No. 17/670,349.

Notice of Allowance, dated Aug. 7, 2020, from corresponding U.S. Appl. No. 16/901,973.

Notice of Allowance, dated Aug. 9, 2018, from corresponding U.S. Appl. No. 15/882,989.

Notice of Allowance, dated Aug. 9, 2021, from corresponding U.S. Appl. No. 16/881,699.

Notice of Allowance, dated Aug. 9, 2022, from corresponding U.S. Appl. No. 17/832,313.

Notice of Allowance, dated Dec. 10, 2018, from corresponding U.S. Appl. No. 16/105,602.

Notice of Allowance, dated Dec. 11, 2019, from corresponding U.S. Appl. No. 16/278,122.

Notice of Allowance, dated Dec. 11, 2019, from corresponding U.S. Appl. No. 16/593,634.

Notice of Allowance, dated Dec. 12, 2017, from corresponding U.S. Appl. No. 15/169,643.

Notice of Allowance, dated Dec. 12, 2017, from corresponding U.S. Appl. No. 15/619,212.

Notice of Allowance, dated Dec. 12, 2017, from corresponding U.S. Appl. No. 15/619,382.

Notice of Allowance, dated Dec. 13, 2019, from corresponding U.S. Appl. No. 16/512,033.

Notice of Allowance, dated Dec. 13, 2021, from corresponding U.S. Appl. No. 16/908,081.

Notice of Allowance, dated Dec. 13, 2021, from corresponding U.S. Appl. No. 17/347,853.

Notice of Allowance, dated Dec. 15, 2020, from corresponding U.S. Appl. No. 16/989,086.

Notice of Allowance, dated Dec. 16, 2019, from corresponding U.S. Appl. No. 16/505,461.

Notice of Allowance, dated Dec. 17, 2020, from corresponding U.S. Appl. No. 17/034,772.

Notice of Allowance, dated Dec. 18, 2019, from corresponding U.S. Appl. No. 16/659,437.

Notice of Allowance, dated Dec. 2, 2021, from corresponding U.S. Appl. No. 16/901,654.

Notice of Allowance, dated Dec. 23, 2019, from corresponding U.S. Appl. No. 16/656,835.

Notice of Allowance, dated Dec. 23, 2020, from corresponding U.S. Appl. No. 17/068,557.

Notice of Allowance, dated Dec. 3, 2019, from corresponding U.S. Appl. No. 16/563,749.

Notice of Allowance, dated Dec. 30, 2021, from corresponding U.S. Appl. No. 16/938,520.

Notice of Allowance, dated Dec. 31, 2018, from corresponding U.S. Appl. No. 16/159,634.

Notice of Allowance, dated Dec. 31, 2019, from corresponding U.S. Appl. No. 16/404,399.

Notice of Allowance, dated Dec. 4, 2019, from corresponding U.S. Appl. No. 16/594,670.

Notice of Allowance, dated Dec. 5, 2017, from corresponding U.S. Appl. No. 15/633,703.

Notice of Allowance, dated Dec. 6, 2017, from corresponding U.S. Appl. No. 15/619,451.

Notice of Allowance, dated Dec. 6, 2017, from corresponding U.S. Appl. No. 15/619,459.

Notice of Allowance, dated Dec. 7, 2020, from corresponding U.S. Appl. No. 16/817,136.

Notice of Allowance, dated Dec. 8, 2021, from corresponding U.S. Appl. No. 17/397,472.

Notice of Allowance, dated Dec. 9, 2019, from corresponding U.S. Appl. No. 16/565,261.

Notice of Allowance, dated Dec. 9, 2020, from corresponding U.S. Appl. No. 16/404,491.

Notice of Allowance, dated Feb. 1, 2022, from corresponding U.S. Appl. No. 17/346,509.

Notice of Allowance, dated Feb. 10, 2020, from corresponding U.S. Appl. No. 16/552,765.

Notice of Allowance, dated Feb. 11, 2021, from corresponding U.S. Appl. No. 17/086,732.

Notice of Allowance, dated Feb. 12, 2020, from corresponding U.S. Appl. No. 16/572,182.

Notice of Allowance, dated Feb. 13, 2019, from corresponding U.S. Appl. No. 16/041,563.

Notice of Allowance, dated Feb. 14, 2019, from corresponding U.S. Appl. No. 16/226,272.

Notice of Allowance, dated Feb. 14, 2022, from corresponding U.S. Appl. No. 16/623,157.

Notice of Allowance, dated Feb. 19, 2019, from corresponding U.S. Appl. No. 16/159,632.

Notice of Allowance, dated Feb. 19, 2021, from corresponding U.S. Appl. No. 16/832,451.

Notice of Allowance, dated Feb. 22, 2022, from corresponding U.S. Appl. No. 17/535,065.

Notice of Allowance, dated Feb. 24, 2021, from corresponding U.S. Appl. No. 17/034,355.

Notice of Allowance, dated Feb. 24, 2021, from corresponding U.S. Appl. No. 17/068,198.

Notice of Allowance, dated Feb. 24, 2021, from corresponding U.S. Appl. No. 17/101,106.

Notice of Allowance, dated Feb. 24, 2021, from corresponding U.S. Appl. No. 17/101,253.

Notice of Allowance, dated Feb. 24, 2022, from corresponding U.S. Appl. No. 17/234,205.

Notice of Allowance, dated Feb. 24, 2022, from corresponding U.S. Appl. No. 17/549,170.

Notice of Allowance, dated Feb. 25, 2020, from corresponding U.S. Appl. No. 16/714,355.

Notice of Allowance, dated Feb. 25, 2021, from corresponding U.S. Appl. No. 17/106,469.

Notice of Allowance, dated Feb. 26, 2021, from corresponding U.S. Appl. No. 17/139,650.

Notice of Allowance, dated Feb. 27, 2019, from corresponding U.S. Appl. No. 16/041,468.

Notice of Allowance, dated Feb. 27, 2019, from corresponding U.S. Appl. No. 16/226,290.

Notice of Allowance, dated Feb. 3, 2021, from corresponding U.S. Appl. No. 16/827,039.

Notice of Allowance, dated Feb. 3, 2021, from corresponding U.S. Appl. No. 17/068,558.

Notice of Allowance, dated Feb. 4, 2022, from corresponding U.S. Appl. No. 17/520,272.

Notice of Allowance, dated Feb. 8, 2022, from corresponding U.S. Appl. No. 17/342,153.

Notice of Allowance, dated Jan. 1, 2021, from corresponding U.S. Appl. No. 17/026,727.

Notice of Allowance, dated Jan. 11, 2022, from corresponding U.S. Appl. No. 17/371,350.

Notice of Allowance, dated Jan. 12, 2022, from corresponding U.S. Appl. No. 17/334,948.

Notice of Allowance, dated Jan. 12, 2022, from corresponding U.S. Appl. No. 17/463,775.

Notice of Allowance, dated Jan. 14, 2020, from corresponding U.S. Appl. No. 16/277,715.

Notice of Allowance, dated Jan. 15, 2021, from corresponding U.S. Appl. No. 17/030,714.

(56) References Cited

OTHER PUBLICATIONS

Notice of Allowance, dated Jan. 18, 2018, from corresponding U.S. Appl. No. 15/619,478.

Notice of Allowance, dated Jan. 18, 2019, from corresponding U.S. Appl. No. 16/159,635.

Notice of Allowance, dated Jan. 2, 2020, from corresponding U.S. Appl. No. 16/410,296.

Notice of Allowance, dated Jan. 23, 2018, from corresponding U.S. Appl. No. 15/619,251.

Notice of Allowance, dated Jan. 24, 2022, from corresponding U.S. Appl. No. 17/340,699.

Notice of Allowance, dated Jan. 25, 2021, from corresponding U.S. Appl. No. 16/410,336.

Notice of Allowance, dated Jan. 26, 2018, from corresponding U.S. Appl. No. 15/619,469.

Notice of Allowance, dated Jan. 26, 2022, from corresponding U.S. Appl. No. 17/491,906.

Notice of Allowance, dated Jan. 29, 2020, from corresponding U.S. Appl. No. 16/278,119.

Notice of Allowance, dated Jan. 31, 2022, from corresponding U.S. Appl. No. 17/472,948.

Notice of Allowance, dated Jan. 5, 2022, from corresponding U.S. Appl. No. 17/475,241.

Notice of Allowance, dated Jan. 6, 2021, from corresponding U.S. Appl. No. 16/595,327.

Notice of Allowance, dated Jan. 6, 2022, from corresponding U.S. Appl. No. 17/407,765.

Notice of Allowance, dated Jan. 7, 2022, from corresponding U.S. Appl. No. 17/222,725.

Notice of Allowance, dated Jan. 8, 2020, from corresponding U.S. Appl. No. 16/600,879.

Notice of Allowance, dated Jul. 10, 2019, from corresponding U.S. Appl. No. 16/237,083.

Notice of Allowance, dated Jul. 10, 2019, from corresponding U.S. Appl. No. 16/403,358.

Notice of Allowance, dated Jul. 12, 2019, from corresponding U.S. Appl. No. 16/278,121.

Notice of Allowance, dated Jul. 14, 2020, from corresponding U.S. Appl. No. 16/701,043.

Notice of Allowance, dated Jul. 15, 2020, from corresponding U.S. Appl. No. 16/791,006.

Notice of Allowance, dated Jul. 16, 2020, from corresponding U.S. Appl. No. 16/901,979.

Notice of Allowance, dated Jul. 17, 2019, from corresponding U.S. Appl. No. 16/055,961.

Notice of Allowance, dated Jul. 17, 2020, from corresponding U.S. Appl. No. 16/778,709.

Notice of Allowance, dated Jul. 19, 2021, from corresponding U.S. Appl. No. 17/306,252.

Notice of Allowance, dated Jul. 20, 2022, from corresponding U.S. Appl. No. 16/938,509.

Notice of Allowance, dated Jul. 21, 2020, from corresponding U.S. Appl. No. 16/557,392.

Notice of Allowance, dated Jul. 23, 2019, from corresponding U.S. Appl. No. 16/220,978.

Notice of Allowance, dated Jul. 26, 2019, from corresponding U.S. Appl. No. 16/409,673.

Notice of Allowance, dated Jul. 26, 2021, from corresponding U.S. Appl. No. 17/151,399.

Notice of Allowance, dated Jul. 26, 2021, from corresponding U.S. Appl. No. 17/207,316.

Notice of Allowance, dated Jul. 27, 2022, from corresponding U.S. Appl. No. 17/679,750.

Notice of Allowance, dated Jul. 29, 2022, from corresponding U.S. Appl. No. 17/670,341.

Notice of Allowance, dated Jul. 31, 2019, from corresponding U.S. Appl. No. 16/221,153.

Notice of Allowance, dated Jul. 7, 2022, from corresponding U.S. Appl. No. 17/571,871.

Notice of Allowance, dated Jul. 8, 2021, from corresponding U.S. Appl. No. 17/201,040.

Notice of Allowance, dated Jun. 1, 2020, from corresponding U.S. Appl. No. 16/813,321.

Notice of Allowance, dated Jun. 11, 2021, from corresponding U.S. Appl. No. 16/862,948.

Notice of Allowance, dated Jun. 11, 2021, from corresponding U.S. Appl. No. 16/862,952.

Notice of Allowance, dated Jun. 11, 2021, from corresponding U.S. Appl. No. 17/216,436.

Notice of Allowance, dated Jun. 12, 2019, from corresponding U.S. Appl. No. 16/278,123.

Notice of Allowance, dated Jun. 12, 2019, from corresponding U.S. Appl. No. 16/363,454.

Notice of Allowance, dated Jun. 14, 2022, from corresponding U.S. Appl. No. 17/679,734.

Notice of Allowance, dated Jun. 16, 2020, from corresponding U.S. Appl. No. 16/798,818.

Notice of Allowance, dated Jun. 16, 2022, from corresponding U.S. Appl. No. 17/119,080.

Notice of Allowance, dated Jun. 17, 2020, from corresponding U.S. Appl. No. 16/656,895.

Notice of Allowance, dated Jun. 18, 2019, from corresponding U.S. Appl. No. 16/410,566.

Notice of Allowance, dated Jun. 19, 2018, from corresponding U.S. Appl. No. 15/894,890.

Notice of Allowance, dated Jun. 19, 2019, from corresponding U.S. Appl. No. 16/042,673.

Notice of Allowance, dated Jun. 19, 2019, from corresponding U.S. Appl. No. 16/055,984.

Notice of Allowance, dated Jun. 2, 2021, from corresponding U.S. Appl. No. 17/198,581.

Notice of Allowance, dated Jun. 2, 2022, from corresponding U.S. Appl. No. 17/493,290.

Notice of Allowance, dated Jun. 21, 2019, from corresponding U.S. Appl. No. 16/404,439.

Notice of Allowance, dated Jun. 22, 2020, from corresponding U.S. Appl. No. 16/791,337.

Notice of Allowance, dated Jun. 23, 2022, from corresponding U.S. Appl. No. 17/588,645.

Notice of Allowance, dated Jun. 27, 2018, from corresponding U.S. Appl. No. 15/882,989.

Notice of Allowance, dated Jun. 29, 2012, from corresponding U.S. Appl. No. 17/675,118.

Notice of Allowance, dated Jun. 4, 2019, from corresponding U.S. Appl. No. 16/159,566.

Notice of Allowance, dated Jun. 5, 2019, from corresponding U.S. Appl. No. 16/220,899.

Notice of Allowance, dated Jun. 5, 2019, from corresponding U.S. Appl. No. 16/357,260.

Notice of Allowance, dated Jun. 6, 2018, from corresponding U.S. Appl. No. 15/875,570.

Notice of Allowance, dated Jun. 6, 2019, from corresponding U.S. Appl. No. 16/159,628.

Notice of Allowance, dated Jun. 7, 2021, from corresponding U.S. Appl. No. 17/099,270.

Notice of Allowance, dated Jun. 8, 2020, from corresponding U.S. Appl. No. 16/712,104.

Notice of Allowance, dated Jun. 8, 2022, from corresponding U.S. Appl. No. 17/722,551.

Notice of Allowance, dated Mar. 1, 2018, from corresponding U.S. Appl. No. 15/853,674.

Notice of Allowance, dated Mar. 1, 2019, from corresponding U.S. Appl. No. 16/059,911.

Notice of Allowance, dated Mar. 10, 2021, from corresponding U.S. Appl. No. 16/925,628.

Notice of Allowance, dated Mar. 10, 2021, from corresponding U.S. Appl. No. 17/128,666.

Notice of Allowance, dated Mar. 13, 2019, from corresponding U.S. Appl. No. 16/055,083.

Notice of Allowance, dated Mar. 14, 2019, from corresponding U.S. Appl. No. 16/055,944.

(56) References Cited

OTHER PUBLICATIONS

Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 22, 2021, from corresponding U.S. Appl. No. 17/346,847.
Notice of Allowance, dated Oct. 3, 2019, from corresponding U.S. Appl. No. 16/511,700.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 14, 2021, from corresponding U.S. Appl. No. 16/808,497.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. No. 15/,894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.
Notice of Allowance, dated Sep. 29, 2021, from corresponding U.S. Appl. No. 17/316,179.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
Notice of Filing Dale for Petition for Post-Grant Review of related U.S. Pat. No. 9,691,090 dated Apr. 12, 2018.
Office Action, dated Apr. 1, 2021, from corresponding U.S. Appl. No. 17/119,080.
Office Action, dated Apr. 12, 2022, from corresponding U.S. Appl. No. 17/670,341.
Office Action, dated Apr. 15, 2021, from corresponding U.S. Appl. No. 17/161,159.
Office Action, dated Apr. 18, 2018, from corresponding U.S. Appl. No. 15/894,819.
Office Action, dated Apr. 18, 2022, from corresponding U.S. Appl. No. 17/670,349.
Office Action, dated Apr. 2, 2021, from corresponding U.S. Appl. No. 17/151,334.

Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 25, 2022, from corresponding U.S. Appl. No. 17/588,645.
Office Action, dated Apr. 26, 2022, from corresponding U.S. Appl. No. 17/151,334.
Office Action, dated Apr. 28, 2020, from corresponding U.S. Appl. No. 16/808,500.
Office Action, dated Apr. 28, 2020, from corresponding U.S. Appl. No. 16/798,818.
Office Action, dated Apr. 28, 2021, from corresponding U.S. Appl. No. 16/808,497.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/791,589.
Office Action, dated Apr. 7, 2020, from corresponding U.S. Appl. No. 16/788,633.
Office Action, dated Apr. 8, 2022, from corresponding U.S. Appl. No. 16/938,509.
Office Action, dated Aug. 12, 2022, from corresponding U.S. Appl. No. 17/679,734.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 17, 2022, from corresponding U.S. Appl. No. 17/836,430.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 2, 2022, from corresponding U.S. Appl. No. 17/670,354.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 30, 2021, from corresponding U.S. Appl. No. 16/938,520.
Office Action, dated Aug. 4, 2022, from corresponding U.S. Appl. No. 17/828,953.
Office Action, dated Aug. 6, 2019, from corresponding U.S. Appl. No. 16/404,491.
Office Action, dated Aug. 6, 2020, from corresponding U.S. Appl. No. 16/862,956.

(56)         References Cited

OTHER PUBLICATIONS

Office Action, dated Dec. 11, 2019, from corresponding U.S. Appl. No. 16/578,712.

Office Action, dated Dec. 13, 2021, from corresponding U.S. Appl. No. 17/476,209.

Office Action, dated Dec. 14, 2018, from corresponding U.S. Appl. No. 16/104,393.

Office Action, dated Dec. 15, 2016, from corresponding U.S. Appl. No. 15/256,419.

Office Action, dated Dec. 16, 2019, from corresponding U.S. Appl. No. 16/563,754.

Office Action, dated Dec. 16, 2019, from corresponding U.S. Appl. No. 16/565,265.

Office Action, dated Dec. 16, 2020, from corresponding U.S. Appl. No. 17/020,275.

Office Action, dated Dec. 17, 2021, from corresponding U.S. Appl. No. 17/395,759.

Office Action, dated Dec. 17, 2021, from corresponding U.S. Appl. No. 17/499,582.

Office Action, dated Dec. 18, 2020, from corresponding U.S. Appl. No. 17/030,714.

Office Action, dated Dec. 19, 2019, from corresponding U.S. Appl. No. 16/410,866.

Office Action, dated Dec. 2, 2019, from corresponding U.S. Appl. No. 16/560,963.

Office Action, dated Dec. 2, 2021, from corresponding U.S. Appl. No. 17/504,102.

Office Action, dated Dec. 23, 2019, from corresponding U.S. Appl. No. 16/593,639.

Office Action, dated Dec. 24, 2020, from corresponding U.S. Appl. No. 17/068,454.

Office Action, dated Dec. 27, 2021, from corresponding U.S. Appl. No. 17/493,332.

Office Action, dated Dec. 29, 2021, from corresponding U.S. Appl. No. 17/479,807.

Office Action, dated Dec. 3, 2018, from corresponding U.S. Appl. No. 16/055,998.

Office Action, dated Dec. 30, 2021, from corresponding U.S. Appl. No. 17/149,421.

Office Action, dated Dec. 31, 2018, from corresponding U.S. Appl. No. 16/160,577.

Office Action, dated Dec. 7, 2021, from corresponding U.S. Appl. No. 17/499,609.

Office Action, dated Dec. 8, 2020, from corresponding U.S. Appl. No. 17/013,758.

Office Action, dated Dec. 8, 2020, from corresponding U.S. Appl. No. 17/068,198.

Office Action, dated Feb. 10, 2021, from corresponding U.S. Appl. No. 16/862,944.

Office Action, dated Feb. 10, 2021, from corresponding U.S. Appl. No. 17/106,469.

Office Action, dated Feb. 15, 2019, from corresponding U.S. Appl. No. 16/220,899.

Office Action, dated Feb. 16, 2022, from corresponding U.S. Appl. No. 16/872,031.

Office Action, dated Feb. 17, 2021, from corresponding U.S. Appl. No. 16/862,948.

Office Action, dated Feb. 18, 2021, from corresponding U.S. Appl. No. 16/862,952.

Office Action, dated Feb. 2, 2021, from corresponding U.S. Appl. No. 17/101,915.

Office Action, dated Feb. 26, 2019, from corresponding U.S. Appl. No. 16/228,250.

Office Action, dated Feb. 3, 2021, from corresponding U.S. Appl. No. 17/013,757.

Office Action, dated Feb. 5, 2020, from corresponding U.S. Appl. No. 16/586,202.

Office Action, dated Feb. 6, 2020, from corresponding U.S. Appl. No. 16/707,762.

Office Action, dated Feb. 8, 2021, from corresponding U.S. Appl. No. 17/139,650.

Office Action, dated Feb. 9, 2021, from corresponding U.S. Appl. No. 16/808,493.

Office Action, dated Feb. 9, 2022, from corresponding U.S. Appl. No. 17/543,546.

Office Action, dated Jan. 14, 2022, from corresponding U.S. Appl. No. 17/499,595.

Office Action, dated Jan. 18, 2019, from corresponding U.S. Appl. No. 16/055,984.

Office Action, dated Jan. 21, 2022, from corresponding U.S. Appl. No. 17/499,624.

Office Action, dated Jan. 22, 2021, from corresponding U.S. Appl. No. 17/099,270.

Office Action, dated Jan. 24, 2020, from corresponding U.S. Appl. No. 16/505,426.

Office Action, dated Jan. 24, 2020, from corresponding U.S. Appl. No. 16/700,049.

Office Action, dated Jan. 25, 2022, from corresponding U.S. Appl. No. 17/494,220.

Office Action, dated Jan. 27, 2020, from corresponding U.S. Appl. No. 16/656,895.

Office Action, dated Jan. 28, 2020, from corresponding U.S. Appl. No. 16/712,104.

Office Action, dated Jan. 29, 2021, from corresponding U.S. Appl. No. 17/101,106.

Office Action, dated Jan. 31, 2019, from corresponding U.S. Appl. No. 17/493,290.

Office Action, dated Jan. 4, 2019, from corresponding U.S. Appl. No. 16/159,566.

Office Action, dated Jan. 4, 2019, from corresponding U.S. Appl. No. 16/159,628.

Office Action, dated Jan. 4, 2021, from corresponding U.S. Appl. No. 17/013,756.

Office Action, dated Jan. 7, 2020, from corresponding U.S. Appl. No. 16/572,182.

Office Action, dated Jan. 7, 2022, from corresponding U.S. Appl. No. 17/387,421.

Office Action, dated Jul. 13, 2021, from corresponding U.S. Appl. No. 17/306,496.

Office Action, dated Jul. 15, 2021, from corresponding U.S. Appl. No. 17/020,275.

Office Action, dated Jul. 18, 2019, from corresponding U.S. Appl. No. 16/410,762.

Office Action, dated Jul. 19, 2021, from corresponding U.S. Appl. No. 17/316,179.

Office Action, dated Jul. 21, 2017, from corresponding U.S. Appl. No. 15/256,430.

Office Action, dated Jul. 21, 2021, from corresponding U.S. Appl. No. 16/901,654.

Office Action, dated Jul. 23, 2019, from corresponding U.S. Appl. No. 16/436,616.

Office Action, dated Jul. 24, 2020, from corresponding U.S. Appl. No. 16/404,491.

Office Action, dated Jul. 27, 2020, from corresponding U.S. Appl. No. 16/595,342.

Office Action, dated Jul. 27, 2022, from corresponding U.S. Appl. No. 17/831,713.

Office Action, dated Jul. 28, 2022, from corresponding U.S. Appl. No. 16/925,550.

Office Action, dated Jul. 7, 2022, from corresponding U.S. Appl. No. 17/370,650.

Office Action, dated Jun. 1, 2020, from corresponding U.S. Appl. No. 16/862,952.

Office Action, dated Jun. 1, 2022, from corresponding U.S. Appl. No. 17/306,496.

Office Action, dated Jun. 14, 2022, from corresponding U.S. Appl. No. 17/346,586.

Office Action, dated Jun. 16, 2022, from corresponding U.S. Appl. No. 17/689,683.

Office Action, dated Jun. 24, 2019, from corresponding U.S. Appl. No. 16/410,336.

(56) References Cited

OTHER PUBLICATIONS

Office Action, dated Jun. 24, 2021, from corresponding U.S. Appl. No. 17/234,205.

Office Action, dated Jun. 27, 2019, from corresponding U.S. Appl. No. 16/404,405.

Office Action, dated Jun. 7, 2021, from corresponding U.S. Appl. No. 17/200,698.

Office Action, dated Jun. 9, 2021, from corresponding U.S. Appl. No. 17/222,523.

Office Action, dated Mar. 1, 2022, from corresponding U.S. Appl. No. 17/119,080.

Office Action, dated Mar. 11, 2019, from corresponding U.S. Appl. No. 16/220,978.

Office Action, dated Mar. 12, 2019, from corresponding U.S. Appl. No. 16/221,153.

Office Action, dated Mar. 15, 2021, from corresponding U.S. Appl. No. 17/149,421.

Office Action, dated Mar. 16, 2020, from corresponding U.S. Appl. No. 16/719,488.

Office Action, dated Mar. 17, 2020, from corresponding U.S. Appl. No. 16/565,395.

Office Action, dated Mar. 17, 2020, from corresponding U.S. Appl. No. 16/719,071.

Office Action, dated Mar. 2, 2022, from corresponding U.S. Appl. No. 17/020,275.

Office Action, dated Mar. 2, 2022, from corresponding U.S. Appl. No. 17/161,159.

Office Action, dated Mar. 2, 2022, from corresponding U.S. Appl. No. 17/200,698.

Office Action, dated Mar. 20, 2020, from corresponding U.S. Appl. No. 16/778,709.

Office Action, dated Mar. 21, 2022, from corresponding U.S. Appl. No. 17/571,871.

Office Action, dated Mar. 22, 2022, from corresponding U.S. Appl. No. 17/187,329.

Office Action, dated Mar. 23, 2020, from corresponding U.S. Appl. No. 16/671,444.

Office Action, dated Mar. 25, 2019, from corresponding U.S. Appl. No. 16/278,121.

Office Action, dated Mar. 25, 2020, from corresponding U.S. Appl. No. 16/701,043.

Office Action, dated Mar. 25, 2020, from corresponding U.S. Appl. No. 16/791,006.

Office Action, dated Mar. 27, 2019, from corresponding U.S. Appl. No. 16/278,120.

Office Action, dated Mar. 30, 2018, from corresponding U.S. Appl. No. 15/894,890.

Office Action, dated Mar. 30, 2018, from corresponding U.S. Appl. No. 15/896,790.

Office Action, dated Mar. 30, 2021, from corresponding U.S. Appl. No. 17/151,399.

Office Action, dated Mar. 4, 2019, from corresponding U.S. Appl. No. 16/237,083.

Office Action, dated May 12, 2022, from corresponding U.S. Appl. No. 17/509,974.

Office Action, dated May 14, 2020, from corresponding U.S. Appl. No. 16/808,497.

Office Action, dated May 14, 2020, from corresponding U.S. Appl. No. 16/808,503.

Office Action, dated May 15, 2020, from corresponding U.S. Appl. No. 16/808,493.

Office Action, dated May 16, 2018, from corresponding U.S. Appl. No. 15/882,989.

Office Action, dated May 16, 2022, from corresponding U.S. Appl. No. 17/679,750.

Office Action, dated May 17, 2019, from corresponding U.S. Appl. No. 16/277,539.

Office Action, dated May 18, 2021, from corresponding U.S. Appl. No. 17/196,570.

Office Action, dated May 2, 2018, from corresponding U.S. Appl. No. 15/894,809.

Office Action, dated May 2, 2019, from corresponding U.S. Appl. No. 16/104,628.

Office Action, dated May 24, 2022, from corresponding U.S. Appl. No. 17/674,187.

Office Action, dated May 29, 2020, from corresponding U.S. Appl. No. 16/862,944.

Office Action, dated May 29, 2020, from corresponding U.S. Appl. No. 16/862,948.

Office Action, dated May 29, 2020, from corresponding U.S. Appl. No. 16/863,226.

Office Action, dated May 5, 2020, from corresponding U.S. Appl. No. 16/410,336.

Office Action, dated May 9, 2022, from corresponding U.S. Appl. No. 16/840,943.

Office Action, dated Nov. 1, 2017, from corresponding U.S. Appl. No. 15/169,658.

Office Action, dated Nov. 10, 2021, from corresponding U.S. Appl. No. 17/380,485.

Office Action, dated Nov. 10, 2021, from corresponding U.S. Appl. No. 17/409,999.

Office Action, dated Nov. 12, 2020, from corresponding U.S. Appl. No. 17/034,355.

Office Action, dated Nov. 12, 2020, from corresponding U.S. Appl. No. 17/034,772.

Office Action, dated Nov. 12, 2021, from corresponding U.S. Appl. No. 17/346,586.

Office Action, dated Nov. 12, 2021, from corresponding U.S. Appl. No. 17/373,444.

Office Action, dated Nov. 15, 2018, from corresponding U.S. Appl. No. 16/059,911.

Office Action, dated Nov. 15, 2019, from corresponding U.S. Appl. No. 16/552,758.

Office Action, dated Nov. 16, 2021, from corresponding U.S. Appl. No. 17/370,650.

Office Action, dated Nov. 16, 2021, from corresponding U.S. Appl. No. 17/486,350.

Office Action, dated Nov. 18, 2019, from corresponding U.S. Appl. No. 16/560,885.

Office Action, dated Nov. 18, 2019, from corresponding U.S. Appl. No. 16/560,889.

Office Action, dated Nov. 18, 2019, from corresponding U.S. Appl. No. 16/572,347.

Office Action, dated Nov. 19, 2019, from corresponding U.S. Appl. No. 16/595,342.

Office Action, dated Nov. 20, 2019, from corresponding U.S. Appl. No. 16/595,327.

Office Action, dated Nov. 23, 2018, from corresponding U.S. Appl. No. 16/042,673.

Office Action, dated Nov. 23, 2021, from corresponding U.S. Appl. No. 17/013,756.

Office Action, dated Nov. 24, 2020, from corresponding U.S. Appl. No. 16/925,628.

Office Action, dated Nov. 26, 2021, from corresponding U.S. Appl. No. 16/925,550.

Office Action, dated Nov. 4, 2021, from corresponding U.S. Appl. No. 17/491,906.

Office Action, dated Nov. 8, 2021, from corresponding U.S. Appl. No. 16/872,130.

Office Action, dated Oct. 10, 2018, from corresponding U.S. Appl. No. 16/041,563.

Office Action, dated Oct. 10, 2018, from corresponding U.S. Appl. No. 16/055,083.

Office Action, dated Oct. 10, 2018, from corresponding U.S. Appl. No. 16/055,944.

Office Action, dated Oct. 14, 2020, from corresponding U.S. Appl. No. 16/927,658.

Office Action, dated Oct. 15, 2018, from corresponding U.S. Appl. No. 16/054,780.

Office Action, dated Oct. 15, 2021, from corresponding U.S. Appl. No. 16/908,081.

(56) References Cited

OTHER PUBLICATIONS

Office Action, dated Oct. 16, 2019, from corresponding U.S. Appl. No. 16/557,392.
Office Action, dated Oct. 16, 2020, from corresponding U.S. Appl. No. 16/808,489.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 15, 2021, from corresponding U.S. Appl. No. 16/623,157.
Office Action, dated Sep. 16, 2019, from corresponding U.S. Appl. No. 16/277,715.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 24, 2021, from corresponding U.S. Appl. No. 17/342,153.
Office Action, dated Sep. 4, 2020, from corresponding U.S. Appl. No. 16/989,086.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Petition for Post-Grant Review of related U.S. Pat. No. 9,691,090 dated Mar. 27, 2018.
Restriction Requirement, dated Apr. 10, 2019, from corresponding U.S. Appl. No. 16/277,715.
Restriction Requirement, dated Apr. 12, 2022, from corresponding U.S. Appl. No. 17/584,187.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 17, 2021, from corresponding U.S. Appl. No. 17/475,244.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Restriction Requirement, dated May 5, 2020, from corresponding U.S. Appl. No. 16/808,489.

Restriction Requirement, dated Nov. 10, 2021, from corresponding U.S. Appl. No. 17/366,754.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Oct. 6, 2021, from corresponding U.S. Appl. No. 17/340,699.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
International Search Report, dated Apr. 12, 2022, from corresponding International Application No. PCT/US2022/016735.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Dec. 22, 2021, from corresponding International Application No. PCT/US2021/051217.
International Search Report, dated Feb. 11, 2022, from corresponding International Application No. PCT/US2021/053518.
International Search Report, dated Feb. 14, 2022, from corresponding International Application No. PCT/US2021/058274.
International Search Report, dated Jan. 14, 2019, from corresponding International Application No. PCT/US2018/046949.
International Search Report, dated Jan. 5, 2022, from corresponding International Application No. PCT/US2021/050497.
International Search Report, dated Jan. 7, 2019, from corresponding International Application No. PCT/US2018/055772.
International Search Report, dated Jun. 1, 2022, from corresponding International Application No. PCT/US2022/016930.
International Search Report, dated Jun. 21, 2017, from corresponding International Application No. PCT/US2017/025600.
International Search Report, dated Jun. 22, 2022, from corresponding International Application No. PCT/US2022/019358.
International Search Report, dated Jun. 24, 2022, from corresponding International Application No. PCT/US2022/019882.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 18, 2022, from corresponding International Application No. PCT/ US2022/013733.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated May 12, 2022, from corresponding International Application No. PCT/US2022/015929.

(56) References Cited

OTHER PUBLICATIONS

International Search Report, dated May 17, 2022, from corresponding International Application No. PCT/US2022/015241.
International Search Report, dated May 19, 2022, from corresponding International Application No. PCT/US2022/015637.
International Search Report, dated Nov. 19, 2018, from corresponding International Application No. PCT/US2018/046939.
International Search Report, dated Nov. 3, 2021, from corresponding International Application No. PCT/US2021/040893.
International Search Report, dated Nov. 3, 2021, from corresponding International Application No. PCT/US2021/044910.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
International Search Report, dated Sep. 15, 2021, from corresponding International Application No. PCT/US2021/033631.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Written Opinion of the International Searching Authority, dated Aug. 15, 2017, from corresponding International Written Opinion of the International Searching Authority, dated Aug. 15, 2017, from corresponding International Application No. PCT/US2017/036919.
Written Opinion of the International Searching Authority, dated Aug. 21, 2017, from corresponding International Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036920.
Written Opinion of the International Searching Authority, dated Aug. 8, 2017, from corresponding International Application No. PCT/US2017/036890.

Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Dec. 14, 2018, from corresponding International Application No. PCT/US2018/045296.
Written Opinion of the International Searching Authority, dated Dec. 22, 2021, from corresponding International Application No. PCT/US2021/051217.
Written Opinion of the International Searching Authority, dated Feb. 11, 2022, from corresponding International Application No. PCT/US2021/053518.
Written Opinion of the International Searching Authority, dated Feb. 14, 2022, from corresponding International Application No. PCT/US2021/058274.
Written Opinion of the International Searching Authority, dated Jan. 14, 2019, from corresponding International Application No. PCT/US2018/046949.
Written Opinion of the International Searching Authority, dated Jan. 5, 2022, from corresponding International Application No. PCT/US2021/050497.
Written Opinion of the International Searching Authority, dated Jan. 7, 2019, from corresponding International Application No. PCT/US2018/055772.
Written Opinion of the International Searching Authority, dated Jun. 1, 2022, from corresponding International Application No. PCT/US2022/016930.
Written Opinion of the International Searching Authority, dated Jun. 21, 2017, from corresponding International Application No. PCT/US2017/025600.
Written Opinion of the International Searching Authority, dated Jun. 22, 2022, from corresponding International Application No. PCT/US2022/019358.
Written Opinion of the International Searching Authority, dated Jun. 24, 2022, from corresponding International Application No. PCT/US2022/019882.
Written Opinion of the International Searching Authority, dated Jun. 6, 2017, from corresponding International Application No. PCT/US2017/025611.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 18, 2022, from corresponding International Application No. PCT/US2022/013733.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated May 12, 2022, from corresponding International Application No. PCT/US2022/015929.
Written Opinion of the International Searching Authority, dated May 17, 2022, from corresponding International Application No. PCT/US2022/015241.
Written Opinion of the International Searching Authority, dated May 19, 2022, from corresponding International Application No. PCT/US2022/015637.
Written Opinion of the International Searching Authority, dated Nov. 12, 2021, from corresponding International Application No. PCT/US2021/043481.

(56)         References Cited

OTHER PUBLICATIONS

Written Opinion of the International Searching Authority, dated Nov. 19, 2018, from corresponding International Application No. PCT/US2018/046939.

Written Opinion of the International Searching Authority, dated Nov. 3, 2021, from corresponding International Application No. PCT/US2021/040893.

Written Opinion of the International Searching Authority, dated Nov. 3, 2021, from corresponding International Application No. PCT/US2021/044910.

Written Opinion of the International Searching Authority, dated Oct. 11, 2018, from corresponding International Application No. PCT/US2018/043975.

Written Opinion of the International Searching Authority, dated Oct. 11, 2018, from corresponding International Application No. PCT/US2018/043976.

Written Opinion of the International Searching Authority, dated Oct. 11, 2018, from corresponding International Application No. PCT/US2018/043977.

Written Opinion of the International Searching Authority, dated Oct. 11, 2018, from corresponding International Application No. PCT/US2018/044026.

Written Opinion of the International Searching Authority, dated Oct. 11, 2018, from corresponding International Application No. PCT/US2018/045240.

Written Opinion of the International Searching Authority, dated Oct. 12, 2017, from corresponding International Application No. PCT/US2017/036888.

Written Opinion of the International Searching Authority, dated Oct. 12, 2018, from corresponding International Application No. PCT/US2018/044046.

Written Opinion of the International Searching Authority, dated Oct. 16, 2018, from corresponding International Application No. PCT/US2018/045243.

Written Opinion of the International Searching Authority, dated Oct. 18, 2018, from corresponding International Application No. PCT/US2018/045249.

Written Opinion of the International Searching Authority, dated Oct. 20, 2017, from corresponding International Application No. PCT/US2017/036917.

Written Opinion of the International Searching Authority, dated Oct. 3, 2017, from corresponding International Application No. PCT/US2017/036912.

Written Opinion of the International Searching Authority, dated Sep. 1, 2017, from corresponding International Application No. PCT/US2017/036896.

Written Opinion of the International Searching Authority, dated Sep. 12, 2018, from corresponding International Application No. PCT/US2018/037504.

Written Opinion of the International Searching Authority, dated Sep. 15, 2021, from corresponding International Application No. PCT/US2021/033631.

Written Opinion of the International Searching Authority, dated Apr. 12, 2022, from corresponding International Application No. PCT/US2022/016735.

U.S. Appl. No. 17/480,377, Jan. 4, 2022, Office Action.

U.S. Appl. No. 17/480,377, May 16, 2022, Office Action.

U.S. Appl. No. 17/480,377, Sep. 1, 2022, Notice of Allowance.

* cited by examiner

130

500

510

DATA PROCESSING SYSTEMS AND METHODS FOR AUTOMATICALLY DETECTING TARGET DATA TRANSFERS AND TARGET DATA PROCESSING

CROSS-REFERENCE TO RELATED APPLICATIONS

This application is a national phase entry of PCT/US2021/051217, filed Sep. 21, 2021, which claims the benefit of U.S. Provisional Patent Application Ser. No. 63/080,917, filed Sep. 21, 2020, the entire disclosures of which are hereby incorporated herein by reference in their entirety.

TECHNICAL FIELD

The present disclosure involves computer-implemented systems and processes for protection of system software, or data from destruction, unauthorized modification, and/or unauthorized disclosure securing by, for example, detecting the transfer and/or processing of personal data occurring via a website, mobile application, and/or the like.

BACKGROUND

Software applications such as websites, mobile applications, and/or the like often collect and/or use personal data such as users' home addresses, social security number, and/or credit card numbers. Such software applications can include functionality that requires or involves transferring the personal data to different entities that are located in various locations. Therefore, an organization's use of software applications such as websites, mobile applications, and/or the like can often expose the organization to significant risk of experiencing a data privacy incident and to having to comply with various personal data processing requirements of different jurisdictions.

In many instances, changes in the software application can introduce vulnerabilities or other risks that are difficult to detect due to their implementation in program code. These vulnerabilities or other risks can result from, for example, updates made to the program code to introduce or change the collection and/or use of personal data. In one example, a software engineer who is maintaining a website for an organization may not appreciate that modifying the website to collect certain personal data can result in a significant risk to the organization in potentially experiencing a data privacy incident, as well as in not being in compliance with one or more data privacy standards. Furthermore, such modifications are often made without the knowledge of appropriate personal within the organization such a privacy officer. Therefore, a need exists for systems and methods that facilitate the ability of an organization to operate and manage software applications such as websites, mobile applications, and/or the like that use personal data by identifying the risk of the organization experiencing a data privacy incident, as well as complying with personal data processing requirements associated with various data privacy standards in different jurisdictions, and by taking one or more actions to mitigate that risk.

SUMMARY

In general, aspects of the present invention provide methods, apparatus, systems, computing devices, computing entities, and/or the like for protection of system software, or data from destruction, unauthorized modification, and/or unauthorized disclosure securing by, for example, detecting the transfer and/or processing of target data. In accordance with one aspect, a method is provided. According to particular aspects, the method involves: scanning, by computing hardware, a software application to identify functionality configured for processing target data; identifying, by the computing hardware, a plurality of fields associated with the functionality; identifying, by the computing hardware, metadata associated with a field from the plurality of fields; generating, by the computing hardware and from the metadata, an identification of a type of data associated with the field using at least one of a rules-based model or a machine-learning model; determining, by the computing hardware, a location based on the processing of the target data by the functionality; determining, by the computing hardware, a risk associated with the functionality processing the target data based on the location and the type of data for the field; determining, by the computing hardware, that the risk satisfies a threshold level of risk; and responsive to determining that the risk satisfies the threshold level of risk, causing, by the computing hardware, an action to be performed to mitigate the risk.

For example, the software application may comprise a website and the functionality may comprise a webform found on the website in which at least one of the plurality of fields is used on the webform to collect the target data. In another example, the software application may comprise a mobile application and the functionality may comprise a graphical user interface provided through the mobile application in which at least one of the plurality of fields is used on the graphical user interface to collect the target data.

Accordingly to particular aspects, the action may comprise at least one of generating an electronic communication sent to personnel identifying the functionality and the risk, causing the software application to become unavailable, or disabling the functionality in the software application. In addition, the risk may comprise at least one of a risk of experiencing a data privacy incident due to the functionality processing the target data and a risk of being noncompliant with a data privacy standard due to the functionality processing the target data.

According to some aspects, the method may further comprise determining, by the computing hardware, a vendor associated with the functionality based on metadata associated with the functionality, wherein the location is a jurisdiction in which the vendor processes data and processing of the target data by the functionality involves transferring the target data to the location. Further, according to some aspects, determining the risk associated with the functionality processing the target data based on the type of data for the field and the location involves using at least one of a second rules-based model or a second machine learning model to generate the risk, wherein the risk represents a likelihood of experiencing at least one of a data privacy incident due to the functionality processing the target data or being noncompliant with a data privacy standard due to the functionality processing the target data.

In accordance with another aspect, a system comprising a non-transitory computer-readable medium storing instructions and a processing device communicatively coupled to the non-transitory computer-readable medium. Accordingly, the processing device is configured to execute the instructions and thereby perform operations comprising: scanning a software application to identify functionality configured for processing target data; identifying metadata associated with the functionality; processing the metadata using at least one of a rules-based model or a machine learning model to generate an identification of a type of data associated with the functionality; determining a location based on the processing of the target data by the functionality; determining a risk associated with the functionality processing the target data based on the type of data and the location; determining the risk satisfies a threshold level of risk; and responsive to determining the risk satisfies the threshold level of risk, causing an action to be performed to mitigate the risk.

According to particular aspects, the action may comprise at least one of generating an electronic communication sent to personnel identifying the functionality and the risk, causing the software application to become unavailable, or disabling the functionality in the software application. According to particular aspects, the risk may comprise at least one of a risk of experiencing a data privacy incident due to the functionality processing the target data or a risk of being noncompliant with a data privacy standard due to the functionality processing the target data.

According to some aspects, the operations may further comprise determining a vendor associated with the functionality based on the metadata, wherein the location is a jurisdiction in which the vendor is located and processing of the target data by the functionality involves transferring the target data to the location. In addition, according to some aspects, determining the risk associated with the functionality processing the target data based on the type of data and the location involves processing the type of data and the location using at least one of a second rules-based model or a second machine learning model to generate the risk representing a likelihood of experiencing at least one of a data privacy incident due to the functionality processing the target data or being noncompliant with a data privacy standard due to the functionality processing the target data.

In accordance with yet another aspect, a non-transitory computer-readable medium is provided. The non-transitory computer-readable medium having program code that is stored thereon, the program code executable by one or more processing devices for performing operations comprising: scanning a software application to identify functionality configured for processing target data; identifying metadata associated with the functionality; identifying a type of data associated with the functionality based on the metadata; determining a location based on the processing of the target data by the functionality; processing the type of data and the location using at least one of a rules-based model or a machine learning model to generate a risk representing a likelihood of experiencing a data incident due to the functionality processing the target data; determining the risk satisfies a threshold level of risk; and responsive to determining the risk satisfies the threshold level of risk, causing an action to be performed to mitigate the risk.

For example, the software application may comprise a website and the functionality may comprise a webform found on the website in which the functionality is used on the webform to collect the target data. For example, the software application may comprise a mobile application and the functionality may comprise a graphical user interface provided through the mobile application in which a field is used on the graphical user interface to collect the target data. For example, the data incident may comprise at least one of a data privacy incident due to the functionality processing the target data or a risk of being noncompliant with a data privacy standard due to the functionality processing the target data.

According to particular aspects, the action may comprise at least one of generating an electronic communication sent to personnel identifying the functionality and the risk, causing the software application to become unavailable, or disabling the functionality in the software application. According to particular aspects, the risk may comprise at least one of a risk of experiencing a data privacy incident due to the functionality processing the target data or a risk of being noncompliant with a data privacy standard due to the functionality processing the target data.

According to some aspects, identifying the type of data associated with the functionality based on the metadata involves processing the metadata using at least one of a second rules-based model or a second machine learning model to generate an identification of the type of data associated with the functionality. According to some aspects, the operations may further comprise determining a vendor associated with the functionality based on the metadata, wherein the location is a jurisdiction in which the vendor is located and processing of the target data by the functionality involves transferring the target data to the location.

BRIEF DESCRIPTION OF THE DRAWINGS

In the course of this description, reference will be made to the accompanying drawings, which are not necessarily drawn to scale, and wherein.

DETAILED DESCRIPTION

Figure 1:
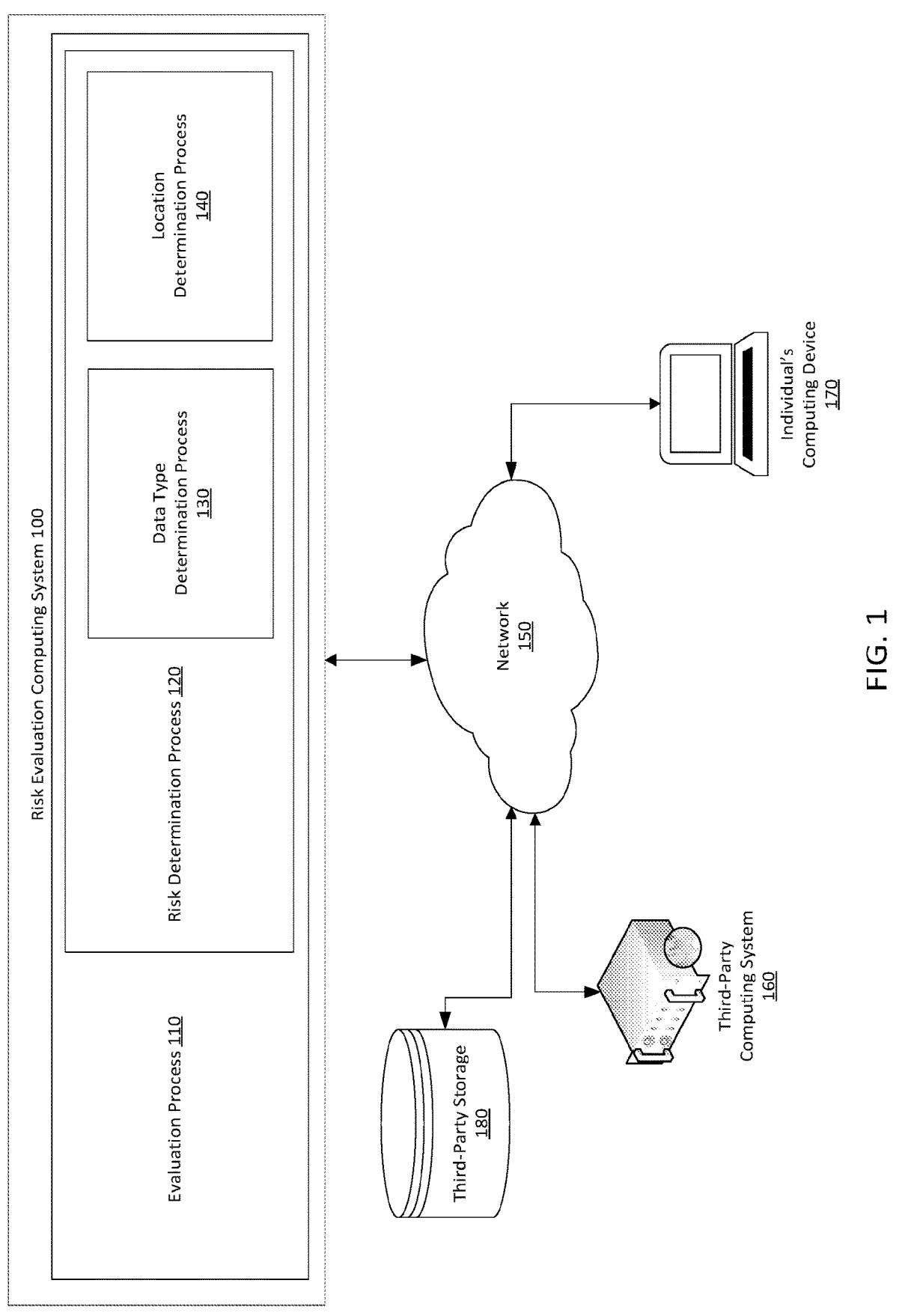
FIG. 1 depicts an example of a computing environment for evaluating a risk associated with target data collection of a website in accordance with various aspects of the present disclosure.

Various aspects for practicing the technologies disclosed herein are described more fully hereinafter with reference to the accompanying drawings, in which some, but not all aspects of the technologies disclosed are shown. Indeed, various aspects disclosed herein are provided so that this disclosure will satisfy applicable legal requirements and should not be construed as limiting or precluding other aspects applying the teachings and concepts disclosed herein. Like numbers in the drawings refer to like elements throughout.

Technical Contributions of Various Aspects

Entities that process (e.g., collects, receives, transmits, stores, processes, shared, and/or the like) sensitive and/or personal data (personal data) associated with particular individuals, such as personally identifiable information (PII)

data, are exposed to, at some level, a risk of experiencing some type of data privacy incident involving the personal data such as a data breach leading to the unauthorized access of the personal data. Furthermore, the entity may be subject to various laws and regulations regarding the processing of such personal data.

Software applications such as websites, mobile applications, and/or the like often collect and/or use personal data. In addition, these software applications often transfer the personal data to entities (e.g., vendors, services, systems, and/or the like) located in various locations. Further, users who are visiting and/or making use of these software applications may be associated with (residing in or currently located in) various locations. As a result, an organization's use of software applications such as websites, mobile applications, and/or the like can often expose the organization to significant risk of experiencing a data privacy incident due to transferring and/or processing personal data in certain locations, as well as having to comply with various personal data processing requirements of different jurisdictions.

For instance, personnel of an organization who are responsible for constructing, maintaining, managing, and/or the like of software applications such as websites, mobile applications, and/or the like may not appreciate risks that result from introducing the collection and/or use of personal data into the software applications. For example, a software engineer who revises a website to collect and transfer personal data to a particular system found in a location (e.g., jurisdiction) known for experiencing a high number of data breaches may not appreciate that the revision to the website can result in a significant increase in risk to the organization in potentially experiencing a data privacy incident. Therefore, the revision to the website can lead to the introduction of operational and/or system vulnerabilities for the organization. Furthermore, these operational and/or system vulnerabilities can be highly technical in nature since the vulnerabilities occur as a result of modifying program code that implements a website or other software application. Consequently, such vulnerabilities may be difficult or infeasible to detect by appropriate personnel within the organization, such as a privacy officer.

Accordingly, various aspects of the disclosure address several of the technical challenges associated with the use (e.g., collection, storage, transfer, and/or the like) of target data, such as personal data, in software applications such as websites, mobile applications, and/or the like by providing a risk evaluation computing system configured to detect the use of target data associated with these software applications and evaluate the risk resulting from the use of the target data. For instance, the risk evaluation computing system can scan a software application (e.g., one or more webpages of a website) to identify the collection and/or transfer of target data by the software application. The risk evaluation computing system can identify the types of target data that is being collected and/or transferred by the software application, as well as identifying entities such as vendors, services, systems, and/or the like that exchange (e.g., transfer) target data with the software application. As discussed further herein, according to some aspects, the risk evaluation computing system may use a machine-learning model to identify the types of target data being used by the software application. Further, according to some aspects, the risk evaluation computing system identifies locations associated with the entities such as, for example, locations of the entities' servers used in collecting, transferring, processing, storing, and/or the like the target data exchanged with the software application.

In some aspects, the risk evaluation computing system can also determine a risk associated with the use of the target data by the software application. For instance, the risk evaluation computing system can use a rules-based model, a machine-learning model, or some combination thereof to determine the risk. The risk evaluation computing system may compare the current use of the target data by the software application with a previous use to determine whether a change has occurred with respect to the use of the target data by the software application. Accordingly, any detected change in use may be reflected in the determined risk.

Various aspects of the risk evaluation computing system may perform one or more operations in response to the risk satisfying a threshold (e.g., equaling or exceeding a predefined level of risk). For instance, the risk evaluation computing system may generate and send some form of communication to one or more individuals to notify the individuals of the risk involved with the software application processing the target data. Additionally or alternatively, a suitable computing system (e.g., the risk evaluation computing system or a computing system receiving a risk notification from the risk evaluation computing system) may perform some type of operation to discontinue the software application's use of the personal data. In one example, according to one aspect, such a computing system may have the software application made unavailable ("locked") so that users are unable to access the software application. In another example, such a computing system may disable the functionality of the software application that directly makes use of the target data.

Various aspects of the disclosure provided herein address technical disadvantages encountered in designing or implementing various software applications such as websites, mobile applications, and/or the like that use target data. Specifically, various aspects of the disclosure provide a risk evaluation computing system that can monitor various software applications and evaluate the risk involved in the applications' use of target data. Further, the risk evaluation computing system can perform operations so that the risk is addressed accordingly, such as by causing the software applications or specific functionality therein to be modified or disable. As a result, various aspects of the disclosure can increase the security, reliability, capacity, and efficiency in using software applications in conjunction with target data. In doing so, various aspects of the present disclosure make major technical contributions to improving the use of such applications. This in turn translates to more computationally reliable, secure, and/or efficient systems that process target data.

For purposes of this disclosure, a website is discussed as the software application making use of target data in the remainder of the disclosure in describing aspects of the disclosure. However, various aspects of the disclosure may be used in conjunction with other forms of software applications such as mobile applications, software as a service, multi-user software, and/or the like. A location may be referred to as a jurisdiction. Accordingly, a "jurisdiction" as used herein may refer to, for example, a country, region, group of countries, legal jurisdiction, federation of countries, and/or any other area to which a set of laws and/or regulations may apply.

In addition, it is noted that reference is made to target data throughout the remainder of the application. However, targeted data is not necessarily limited to information that may be configured as personal and/or sensitive in nature but may also include other forms of data that may introduce risk and be of interest to an entity who is operating a software application making use of such data. For example, target data may include data that relates to an entity's business, operational procedures, legal obligations, and/or the like that are to remain out of the public eye (e.g., trade secret) that can pose a risk if exposed. Further, targeted data may not necessarily be associated with an individual but may be associated with other entities such as a business, organization, government, association, and/or the like.

Example Computing Environment

Referring now to the figures, FIG. 1 depicts an example of a computing environment for evaluating a risk associated with a website's use of target data according to various aspects. For example, a website may use various technologies, such as webforms and/or cookies, to request, collect, track, and/or the like the target data of individuals who visit a website. Therefore, the entity (e.g., organization) providing the website may be interested in understanding the risk involved with having the website use the various technologies in requesting, collecting, tracking, and/or the like the target data of individuals who visit the website.

The entity may provide (e.g., publish) the website through a third-party computing system 160 in which one or more sets of program code may reside that is executable by computing hardware (e.g., Web server and/or application server) for performing one or more functions for controlling the website, providing content on the website, providing functionality for the website, and/or the like. An individual may visit the website by navigating to an address (e.g., uniform resource locator) for the website over a network 150 (e.g., Internet) using a browser application residing on a computing device 170 being used by the individual.

Accordingly, the one or more sets of program code may perform functions such as controlling the operation of the computing device 170 by, for example, rendering one or more webpages for the website on a display of the computing device 170. In addition, the one or more sets of program code may control the transferring of target data of the individual to one or more remote computing systems that collect and/or process the target data. Further, the one or more sets of program code may display a webform, for example, for collecting target data from the individual. In some instances, the entity may store the one or more sets of program code for the website in some type of third-party data storage 180 to make the set(s) of program code available for analysis. The third-party data storage 180 may reside within the third-party system 160 or externally, as shown in FIG. 1.

As noted, the entity may be interested in understanding the risk involved with having the website use the target data of individuals who visit the website. Accordingly, a separate entity may provide a service through a risk analysis computing system 100 for analyzing and evaluating the risk associated with the website's use of the target data. Therefore, the entity associated with the website may make the website (e.g., the one or more sets of program code for the website) available to the risk analysis computing system 100. For example, the entity may upload the website over a network 150 (e.g., the Internet) to the risk analysis computing system 100 from the third-party computing system 160 and/or the third-party data storage 180. In another example, the risk analysis computing system 100 may retrieve the website from the third-party computing system 160 and/or the third-party data storage 180. Yet, in another example, the risk analysis computer system 100 may be configured to perform the analysis on the website directly in the third-party computing system 160 and/or on the third-party data storage 180.

According to various aspects of the disclosure, the risk analysis computing system 100 may comprise computing hardware performing a number of different processes in conducting the analysis and evaluation of the risk involved in the website's use of target data. Specifically, according to particular aspects, the risk analysis computing system 100 performs an evaluation process 110 in evaluating the risk associated with the website's use of target data. As further detailed herein, according to some aspects, the evaluation process 110 involves scanning the website to identify uses of target data such as, for example, a webform provided in the website to allow an individual (user) to provide target data such as, for example, personal data. The evaluation process 110 continues with determining a risk associated with each use of the target data and whether the risk satisfies a threshold. If a risk for a particular use of target data satisfies the threshold, then the evaluation process 110 involves performing one or more operations to mitigate the risk. For example, the operation may involve notifying personal of the risk. In another example, the operation may involve disabling the use of the target data for the web site.

According to particular aspects, the risk analysis computing system 100 may determine the risk associated with a particular use of target data by the website by performing a risk determination process 120. The risk determination process 120 may involve determining the type(s) of target data being used by the functionality (e.g., the webform) of the website involved in the use and determining a vendor associated with the functionality. In addition, the risk determination process 120 may involve determining one or more locations associated with the functionality. The risk determination process 120 may then involve determining the risk for the use of the target data by using a combination of the type(s) of target data being used and the location(s). According to particular aspects, the risk determination process 120 may use a rules-based model, a machine-learning model, or a combination of both in determining the risk.

In addition, according to particular aspects, the risk analysis computing system 100 may determine the type(s) of target data being used by performing a data type determination process 130. The data type determination process 130 may involve identifying a type of data associated with different elements, fields, and/or the like associated with the functionality involved in the use of the target data. The data type determination process 130 may use a rules-based model, a machine-learning model, or a combination of both in identifying the type(s) of target data being used. For example, the rules-based model, machine-learning model, or combination of both may be configured to process metadata associated with the different elements, fields, and/or the like in determining the type(s) of target data being used.

According to particular aspects, the risk analysis computing system 100 may also determine the locations(s) associated with the functionality involved in the use of the target data by performing a location determination process 140. The location determination process 140 may involve determining IP address(es) associated with the determined vendor for the functionality involved in the use of the target data. To accomplish this, the location determination process 140 may involve initiating a series of activations of the functionality from multiple systems located in various geographical locations and analyzing the resulting communications between the functionality and any remote systems. Accordingly, the location determination process 140 may involves analyzing the resulting traffic to determine the source and destination addresses (e.g., IP addresses) of such data communications. Further detail is now provided on the configuration and functionality of the different processes 110, 120, 130, 140 according to various aspects of the disclosure.

Evaluation of Risk

Figure 2:
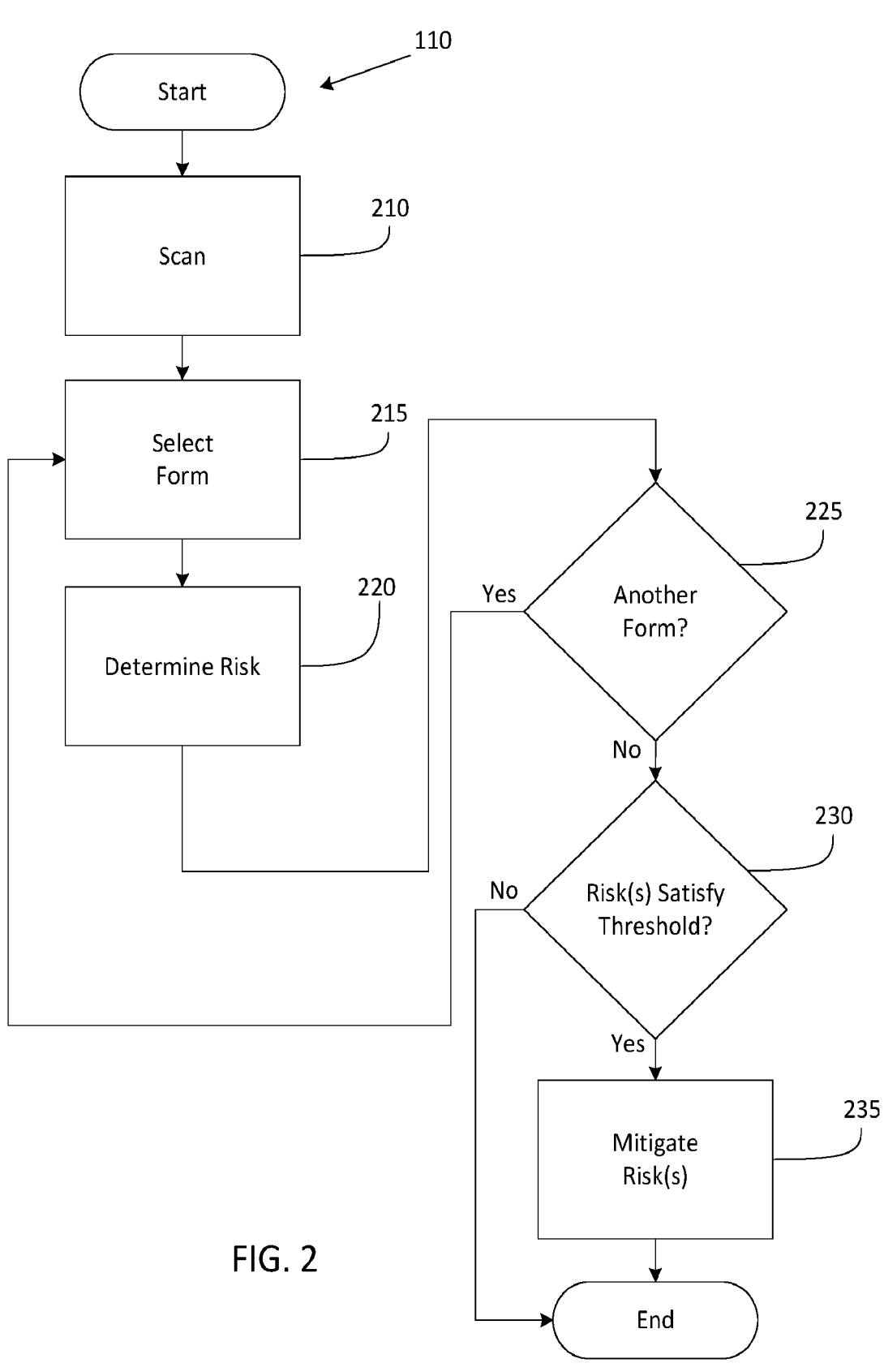
FIG. 2 is a flowchart of a process for evaluating a risk associated with target data collection of a website in accordance with various aspects of the present disclosure.

Turning now to FIG. 2, additional details are provided regarding an evaluation process 100 for evaluating a risk associated with a website's use of target data in accordance with various aspects of the disclosure. Accordingly, the process 110 may be implemented according to various aspects as suitable program code executed on, for example, computing hardware found in the risk analysis computing system 100 as described herein.

Depending on the circumstances, the evaluation process 110 may be carried out to evaluate a website's use of target data at various times. For instance, according to particular aspects, the evaluation process 110 may be carried out at a time when new content has been added to one or more webpages of the website and as a result, a new or revised use of target data may have been introduced to the one or more webpages. For example, a new code release may have been issued for the website and/or a tag manager used for the website may have been updated. While in other instances, the evaluation process 110 may be carried to evaluate a website "on the fly" at a time when a user is visiting the website and the one or more webpages are being rendered. Such a configuration can ensure that any use of target data that has been newly added or modified on the website is identified and evaluated.

A website may collect target data from users (e.g., visitors to the website) and transfer that data to other vendors, services, systems, and/or the like. The vendors, services, systems, and/or the like to which the target data is transferred may be located in one or more locations (jurisdictions) outside of the location (jurisdiction) in which the user is found (e.g., resides and/or from which the user is accessing the website). Therefore, the website may be sending the user's target data to a different jurisdiction. In some instances, such a transfer may represent a significant risk with respect to experiencing a data privacy incident such as a breach of the target data during the transfer. In addition, a location in which the data is received may be a jurisdiction in which the laws and regulations applicable to the target data may be different from those of the user's jurisdiction. This may further increase the risk of using the website.

The evaluation process 110 involves performing a scan of the website to identify any use of target data associated with the website at Step 210. For instance, the website may use a webform or equivalent computing construct that is configured to allow a user to enter target data that is then transferred to a vendor, service, system, and/or the like for processing. The user may enter data into one or more fields or elements (e.g., HyperText Markup Language (HTML) form elements, HTML fields, etc.) in the webform. Each such field or element may have metadata associated with it, as may the webform itself. Therefore, according to various aspects, the evaluation process 110 may involve dynamically scanning the website (e.g., one or more webpages thereof) to detect a webform set having one or more webforms and the elements and/or fields associated with the detected webforms. For instance, according to particular aspects, the evaluation process 110 involves analyzing the HTML used to generate the website to identify the webform set and the associated one or more elements and/or fields.

The evaluation process 110 also involves selecting a first webform from the webform set at Step 215 and determining a risk associated with the collection of the target data by the webform at Step 220. Although a webform is often used on a website to collect target data from a user (e.g., visitor to the website), the webform may not always serve in such a role with respect to target data. For example, the webform may instead be configured to receive target data for the user from an external source. For instance, the webform may receive information (data) from the user such as a username and password and then retrieve target data from some other data source such as the user's employee identifier, home address, social security number, and/or the like.

Figure 3:
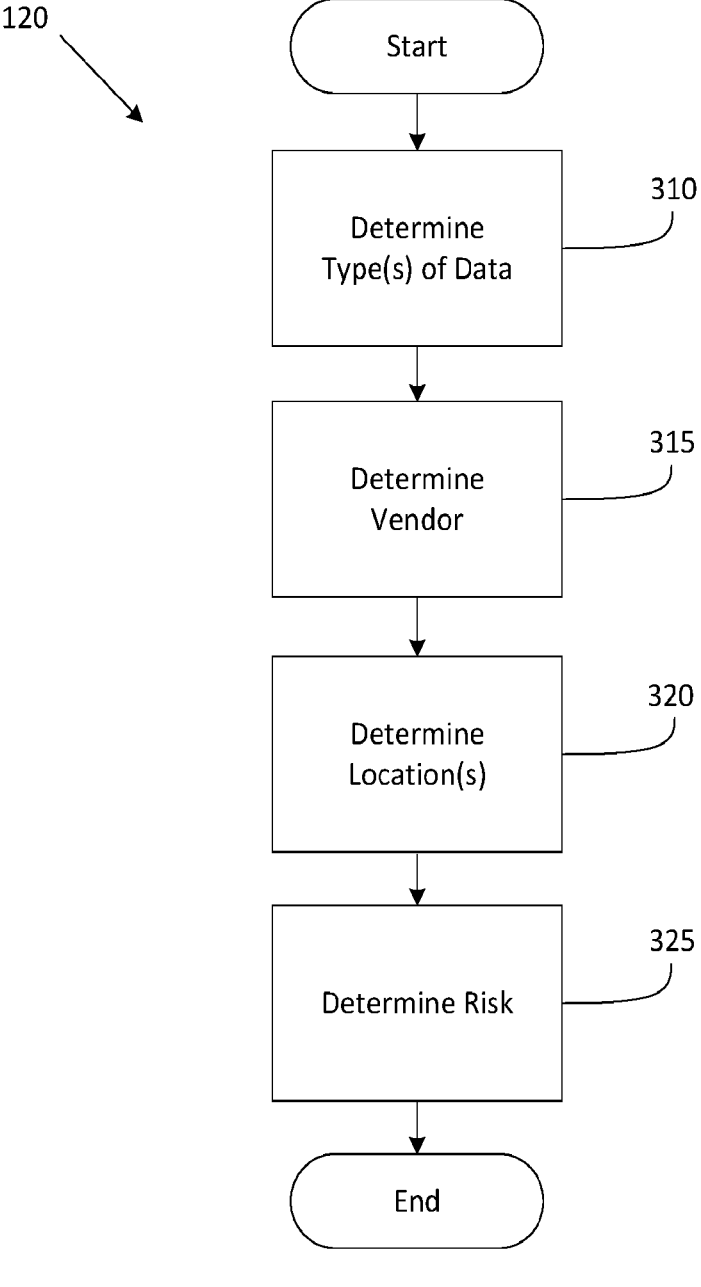
FIG. 3 is a flowchart of a process for determining a risk associated with a webform in accordance with various aspects of the present disclosure.

According to various aspects, this particular step of the evaluation process 110 is performed via a risk determination process 120 shown in FIG. 3. As detailed further herein, the risk determination process 120 involves identifying the type of target data being collected, transferred, processed, and/or the like by the webform, as well as identifying the vendor(s), service(s), system(s), and/or the like that may involve a transfer of the target data and the one or more locations associated with the transfer. The risk determination process 120 then involves generating a level of risk associated with the webform's use of the target data based at least in part on the types of target data, transfers of the target data, and associated location(s) thereof.

The evaluation process 110 continues with determining whether another webform was identified for the website that also makes use of target data at Step 225. If so, then the evaluation process involves returning to Step 215, selecting the next webform, and determining the risk associated with the use of the target data by the newly selected webform as just described.

The evaluation process 110 then continues with determining whether risk associated with any of the webforms satisfies a threshold level of risk at Step 230. For example, the threshold level of risk may be set by the entity (e.g., employee of the entity) associated with the website. In another example, the threshold level of risk be set by an automated process, such as by a rules-based model, that sets the threshold based on one or more factors such as the type of target data being used, the type of use being made of the target data by the website, a retention time of the target data, whether the target data is encrypted, and/or the like. According to various aspects, the risk associated with each of the webforms may represent a likelihood of an entity (e.g., organization) operating the website experiencing a data privacy incident as a result of the webform's use of the target data. In addition, or instead, the risk associated with each of the webforms may represent a likelihood of the entity operating the website in a noncompliant manner with respect to one or more legal and/or industry standards based at least in part on the webform's use of the target data.

According to particular aspects, different threshold levels of risk may be established depending on the type of functionality involved in the use of the target data (e.g., webform, tracking tool, and/or the like). Furthermore, according to some aspects, the risk determination process 120 may involve generating more than one risk for each of the webforms. For example, according to one aspect, the risk determination process 120 may involve generating a first risk representing a likelihood of the entity operating the website and experiencing a data privacy incident as a result of the webform's use of target data and a second, separate risk representing a likelihood of the entity operating the website in a noncompliant manner with respect to one or more legal and/or industry standards based at least in part on the webform's use of the target data. Accordingly, the evaluation process 110 may be carried out to evaluate the multiple risks returned for a webform in determining whether a risk satisfies the threshold level of risk.

Therefore, any of the webforms having a risk that satisfies the threshold level of risk may signal that the webform's use of target data introduces a level of risk that is unacceptable to the entity (e.g., the organization) operating the website. If this is the case, then the evaluation process 110 according to various aspects involves performing one or more operations to mitigate the risk(s) at Step 235. For instance, according to particular aspects, one or more communications may be generated and sent to personnel to notify them of the risk(s). For example, an email or some other type of electronic communication may be generated and sent to the one or more personnel. In another example, a graphical user interface (GUI) may be generated and/or provided that displays the risk(s) and associated information.

According to other aspects, the evaluation process 110 may involve performing one or more operations to disable the use of the target data by the webform(s). For example, a suitable computing system (e.g., the risk evaluation computing system 100 or the third-party computing system 160 that controls the website) can "lock" the website (and/or one or more webpages thereof) so that the website is no longer available to one or more users. For instance, the risk evaluation computing system 100 and/or the third-party computing system 160 can remove (or cause the removal of) the webpages associated with the webform(s) from the Web server hosting the website. In another example, a suitable computing system (e.g., the risk evaluation computing system 100 or the third-party computing system 160 that controls the website) can disable the functionality (e.g., the webform) so that the functionality is no longer available on the website. For instance, the risk evaluation computing system 100 and/or the third-party computing system 160 can disable the ability of website to display the webform(s) so that the target data cannot be used by the webform(s). In another example, the risk evaluation computing system 100 and/or the third-party computing system 160 can disable one or more controls (e.g., buttons) on the webform(s) so that the target data cannot be saved and/or collected. Accordingly, a combination of operations may be performed such as, for example, disabling the functionality and sending one or more communications to personal to notify them of the risk(s) imposed by the use of the target data on the webform(s). Those of ordinary skill in the art can envision other operations that may be carried out according to various aspects to mitigate the risk(s) in light of this disclosure.

As a result, one or more risks introduced by the website's use of target data that poses a level of risk greater than the entity (e.g., the organization) operating the website would like to tolerate can be addressed so as to bring the level of risk to an acceptable level for the entity. In addition, the evaluation process 110 can be carried out in an automated fashion to evaluate and identify risk(s) imposed by a website's use of target data that is problematic for the entity and may not otherwise be identified. For example, the evaluation process 110 may be carried out according to particular aspects to periodically (e.g., weekly, monthly, bi-monthly, and/or the like) evaluate the website. Accordingly, the evaluation process 110 may enable the identification of any risk(s) that have been introduced as a result of the web site being modified to include new and/or changed use of target data.

Further, according to some aspects, the evaluation process 110 may involve identifying any changes that have been introduced into the website with respect to the website's use of target data. For example, although not shown in FIG. 2, the evaluation process 110 (or some other process) may involve comparing the fields and/or elements currently found in the webform with the fields and/or elements found in a previous version of the webform to identify any differences in the fields and/or elements such as new fields and/or elements being added to the webform and/or the use of a particular field and/or element being changed. Identifying such changes can help in identifying a source resulting in (causing) a change in the level of risk imposed by the webform's use of target data and may help in mitigating the change in the level of risk. For example, identifying the changes in the webform may help personnel to pinpoint what may have caused an increase in risk of the webform's use of target data.

Therefore, in order to ensure the evaluation process 110 is carried out on current, up to date information regarding the website, the evaluation process 110 may be performed to repeatedly (e.g., periodically, in response to receiving an instruction, in response to detecting a change in the web site, a webform, and/or the like) scan the web site to determine any changes in the target data used by the website (e.g., any change in the target data that is collected and/or how the target data is processed). After performing an initial, or any subsequent, scan and the related processing for the website as described herein, the data generated by the scan may be stored (e.g., element/field identification, classifications, data types, sources, destinations, etc.). The evaluation process 110 may then be performed later to re-scan the particular website and again perform the processing described herein. The evaluation process 110 may involve comparing the resulting data generated by the most recent analysis to data generated by a previous (e.g., most recent previous) analysis to determine whether there have been any changes in how the website, webform, and/or the like processes target data. For example, a determination may be made as to whether new elements, fields, and/or the like have been added to a website since the last scan, whether such new elements, fields, and/or the like are associated with target data, and/or whether the website now sends target data to a new and/or different location. According to some aspects, the evaluation process 110 may involve generating a notification to personal indicating a change in response to determining that the change has occurred to the website's use of target data.

Although the example of the evaluation process 110 discussed above involves analyzing webforms found on the website with respect to the risk imposed by the webforms' use of target data, the evaluation process 110 according to various aspects may be used to evaluate other functionality found on the web site that makes use of target data. For example, the evaluation process 110 may also be performed to identify other functionality such as tracking tools (e.g., scripts, cookies, web beacons, and/or the like) found on the website that use target data. For example, according to these aspects, the evaluation process 110 may involve performing a scan of a webpage of the website to identify any tracking tools associated with the webpage and/or any respective scripts that may be used to execute, load, introduce, and/or the like the tracking tools. Specifically, for example, the evaluation process 110 may involve using a scanner such as Chrome scanner to scan the webpage as the webpage is being loaded to identify the tracking tools and/or associated scripts. Accordingly, the evaluation process 110 may then involve evaluating the risk imposed by the identified tracking tools' use of target data in the same manner as discussed above with respect to the webforms. Those of ordinary skill in the art will recognize other functionality that may be found on the website and use target data that the evaluation process 110 may be carried out to evaluate according to various aspects in light of this disclosure.

Further, although the example of the evaluation process 110 discussed above involves analyzing websites and their use of target data, aspects of the evaluation process 110 may be carried out to evaluate other forms of software applications that may use target data such as mobile applications. For example, a mobile application may collect target data through a GUI displayed in the mobile application. According to various aspects, the evaluation process 110 may be performed to evaluate these other forms of software applications in a similar manner as described above with respect to websites. For example, Step 210 may be implemented by analyzing source code of a software application. A third-party computing system 160 can provided access to this source code via a communication channel with the risk evaluation computing system 100. Here, the evaluation process 110 may consider aspects of the software application other than GUIs used in collecting target data in evaluating the risk associated with the software application's use of the target data such as, for example, software development kits (SDKs) that have been used in implementing functionality in the software application. Certain SDKs may be known for using target data for particular applications. Therefore, identification of the use of an SDK may lead to the identification of the use of target data for a software application.

Risk Determination

Turning now to FIG. 3, additional details are provided regarding a risk determination process 120 for determining a risk associated with the use of target data on a website in accordance with various aspects of the disclosure. Accordingly, the process 120 may be implement according to various aspects as suitable program code executed on, for example, computing hardware found in the risk analysis computing system 100 as described herein.

The risk determination process 120 involves determining the type(s) of target data used (e.g., collected, processed, transferred, and/or the like) by the functionality at Step 310. Accordingly, this particular step is performed in various aspects via a data type determination process 130 shown in FIG. 4. As discussed further herein, the data type determination process 130 involves using the metadata associated with each of the elements, fields, and/or the like found in the functionality in determining the type(s) of target data used by the functionality.

The risk determination process 120 continues with determining a vendor associated with the functionality (e.g., the webform) at Step 315. For instance, a webform may be associated with a particular vendor or service that may or may not be the same vendor or service providing the website on which the webform is presented. For example, a particular webform may be configured to transmit collected data to a vendor software application such as Salesforce, Marketo, etc., or to a custom web server. Therefore, according to various aspects, the risk determination process 120 involves using metadata associated with the webform (e.g., the webform itself and/or one or more elements, fields, and/or the like of the webform) to determine a vendor associated with the webform.

For example, according to particular aspects, the risk determination process 120 may involve using information derived from the metadata associated with the webform to identify a URL to which the webform transmits collected target data. The URL may then be used to determine the associated vendor, service, system, and/or the like to which data is transferred. According to particular aspects, the risk determination process 120 may be carried out by referencing a data source such as a dictionary, catalog, and/or the like of known URLs and associated vendors, services, systems, and/or the like to locate a URL matching the URL derived from a particular webform's metadata. According to other aspects, the risk determination process 120 may be carried out by determining the domain associated with the URL and then determining the vendor, service, system, and/or the like based on the domain (e.g., by performing an ICANN or "whois" lookup on the domain name).

In another example, the functionality making use of the target data may be a tracking tool. Here, the risk determination process 120 may involve identifying a source for the tracking tool by analyzing one or more flows of data, for example, between a browser rending a webpage and a server serving the webpage to the browser, or between the browser and one or more remote systems (e.g., remote computing entities that one or more scripts loading on the webpage attempt to communicate with). For instance, the risk determination process 120 may involve scanning one or more response headers to identify a source or initiator of the particular tracking tool such as, for example, scanning one or more response headers that have been sent to the browser by a host server associated with the particular tracking tool in response to the host server receiving an HTTP request. Here, the response header may include, for example, a date, size, and/or type of file that the host server is attempting to send to the browser, as well as, or instead, other data such as data about the host server itself. This header information may be used to match a source script with the particular tracking tool or otherwise determine a source script for the particular tracking tool. Depending on the functionality, other steps may be used for determining the vendor(s), service(s), system(s), and/or the like associated with the functionality making use of target data.

The risk determination process 120 continues with determining one or more locations associated with the functionality making use of the target data at Step 320. This particular step is performed in various aspects via a location determination process 140 shown in FIG. 6. As detailed further herein, the location determination process involves identifying the location(s) associated with the functionality based at least in part on the vendor(s), service(s), system(s), and/or the like associated with the functionality. For instance, the functionality may transfer and/or receive target data from one or more of the identified vendor(s), service(s), system(s), and/or the like associated with the functionality. Therefore, the locations (e.g., jurisdictions) in which these vendor(s), service(s), system(s), and/or the like are located may be identified as location(s) associated with the functionality.

The risk determination process 120 continues with determining the risk associated with the functionality at Step 325. Here, according to various aspects, the risk associated with the functionality represents the risk posed by the functionality's use of the target data in experiencing a data privacy incident and/or leading to nonconformance with one or more legal and/or industry standards. This particular step is performed according to various aspects by using a combination of the type(s) of data collected in conjunction with the associated vendor(s), service(s), system(s), and/or the like and location(s) of the functionality to determine a risk associated with the functionality.

For example, a webform may be determined to collect no target data, or particularly low risk target data (e.g., name only, birthday only, etc.), and therefore represents a low risk even when the webform transmits collected target data outside of the location (e.g., jurisdiction) in which such data is collected. Alternatively, a webform may be determined to represent a high risk if the webform collects target data of a particularly personal nature (e.g., social security number, phone number, driver's license number, etc.) and transmits the target data outside of the jurisdiction in which such data was collected. In another example, a webform may be determined to represent a high risk, even if the webform does not transmit target data outside of the jurisdiction in which such data is collected, where the webform transmits such data to a known high-risk vendor, service, system, and/or the like within the jurisdiction.

Accordingly, the processing of particular types of target data may be regulated differently in different jurisdictions. Therefore, if a particular webform transmits a type of target data to a jurisdiction in which processing that type of target data is highly regulated (e.g., subject to high monetary fines for mishandling), then the risk determination process 120 may lead to a determination that the risk associated with that particular webform is high. Alternatively, if the particular webform transmits the type of target data to a jurisdiction in which processing that type of target data is not highly regulated (e.g., subject to minimal penalties for mishandling), then the risk determination process 120 may lead to a determination that the risk associated with that particular webform is low.

Here, according to particular aspects, the risk determination process 120 may involve using a rules-based model in determining the risk associated with the functionality. The rules-based model may comprise a set of rules that sets a risk for the functionality's use of the target data based at least in part on the combination of the type(s) of target data being collected, the vendor(s), service(s), system(s), and/or the like associated with the functionality, and/or the location(s) associated with the functionality. Accordingly, an entity (e.g., an organization) conducting the risk analysis may maintain the set of rules in some type of data storage, such as a database, from which the set of rules can be accessed. According to some aspects, a user interface (e.g., graphical user interface) may be provided so that personnel of the entity may maintain the set of rules.

According to other aspects, the risk determination process 120 may involve using a machine-learning model in determining the risk associated with the functionality. Here, the machine-learning model may be trained using historical data on the same or similar functionality's use of the same or similar type(s) of target data, in association with the same or similar vendor(s), service(s), system(s), and/or the like, and/or location(s). For instance, the machine-learning model may determine a risk in the form of a prediction as to the likelihood of the entity to experience a data privacy incident and/or noncompliance with a legal and/or industry standard due to the functionality's use of the target data. Accordingly, the machine-learning model may be configured using a variety of different types of supervised or unsupervised trained models such as, for example, support vector machine, naive Bayes, decision tree, neural network, and/or the like.

According to particular aspects, the risk determination process 120 may involve using a combination of the rules-based model and the machine-learning model in determining the risk associated with the functionality's use of the target data. Further, according to particular aspects, the rules-based model and/or machine-learning model may be configured to generate separate risks, a first risk associated with the entity experiencing a data privacy incident due to the functionality's use of the target data and a second, separate risk associated with the entity being noncompliant with one or more legal and/or industry standards due to the functionality's use of the target data. In doing so, the risk determination process 120 can be used to identify the risk associated with specific aspects of the functionality's use of the target data. Yet, according to other aspects, the rules-based model and/or machine-learning model may be configured to generate separate risks at a more detailed level such as, for example, a risk with respect to the entity being noncompliant with a specific legal and/or industry standard. This may enable the entity to better recognize and address any significant risk (e.g., satisfies a threshold) posed by the functionality's use of the target data.

Data Type Determination

Figure 4:
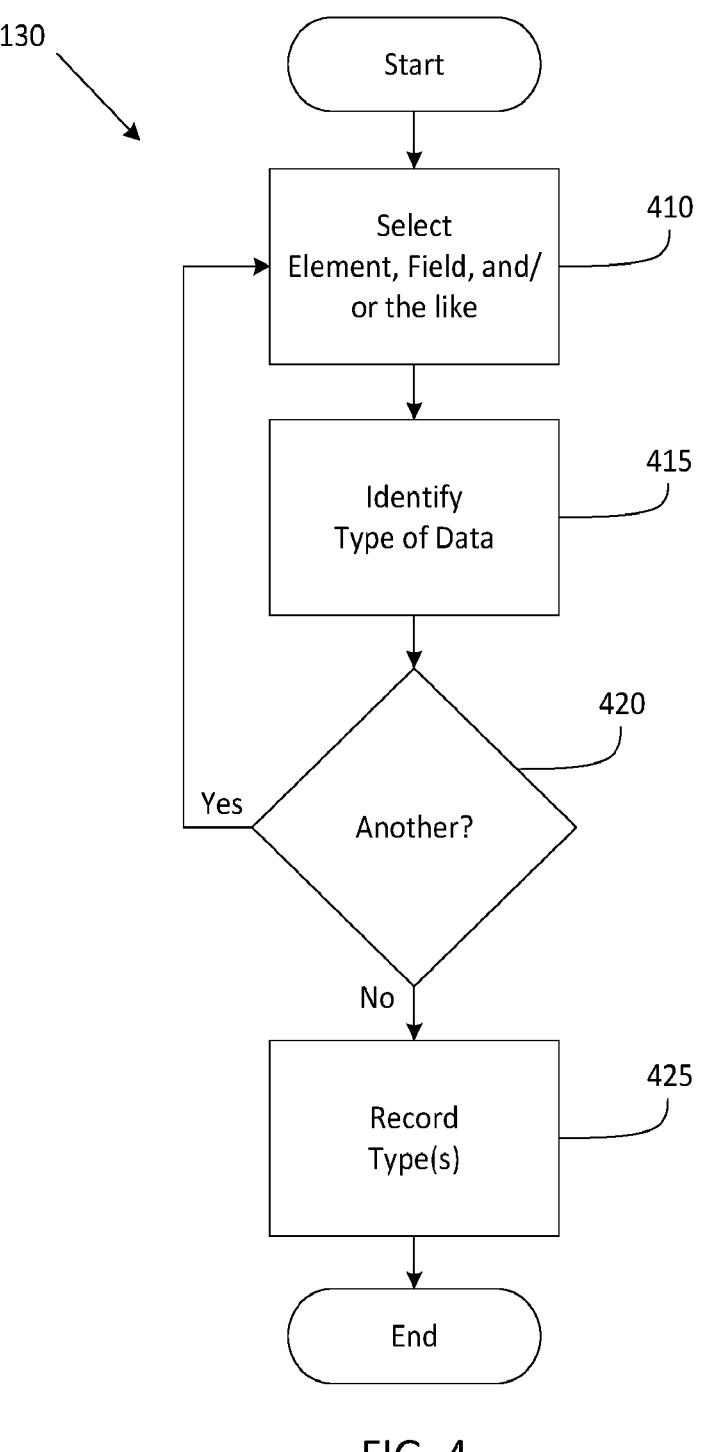
FIG. 4 is a flowchart of a process for identifying types of data collected via a webform in accordance with various aspects of the present disclosure.

Turning now to FIG. 4, additional details are provided regarding a data type determination process 130 for determining the types of target data associated with functionality in accordance with various aspects of the disclosure. Accordingly, the process 130 may be implemented according to various aspects as suitable program code executed on, for example, computing hardware found in the risk analysis computing system 100 as described herein.

The data type determination process 130 involves selecting an element, field, and/or the like for the functionality at Step 410 and identifying the type of data associated with the element, field, and/or the like at Step 415. For instance, if the functionality involves a webform, then the metadata associated with the element, field, and/or the like may be evaluated in identifying the type of data associated with the element, field, and/or the like.

Here, according to various aspects, the data type determination process 130 may involve using a rules-based model in identifying the type of data associated with the element, field, and/or the like. For instance, the rules-based model may comprise a set of rules that identifies a type of data for the element, field, and/or the like based at least in part on metadata associated with the element, field, and/or the like. Accordingly, an entity (e.g., an organization) conducting the risk analysis may maintain the set of rules in some type of data storage, such as a database, from which the set of rules can be accessed. According to some aspects, a user interface (e.g., graphical user interface) may be provided so that personnel of the entity may maintain the set of rules.

According to other aspects, the data type determination process 130 may involve using a machine-learning model in identifying the type of data associated with the element, field, and/or the like. According to some aspects, the machine-learning model may be some type of classification model (e.g., multi-label classification model) that provides a classification for the element, field, and/or the like. For example, the machine-learning model may be a supervised or unsupervised trained model that provides a prediction as to the type of data associated with the element, field, and/or the like. The machine-learning model may use a variety of different types of prediction models such as, for example, support vector machines, logistic regression, neural network, and/or the like. Here, the metadata for the element, field, and/or the like may be processed (e.g., provided as input) using the machine-learning model and the model may provide output in the form of a classification for the type of data associated with the element, field, and/or the like.

Accordingly, the rules-based model, the machine-learning model, or combination thereof may provide, for example, an output identifying the particular element, field, and/or the like as target data or not target data. In another example, the rules-based model, the machine-learning model, or combination thereof may provide output identifying the particular element, field, and/or the like as a level of target data such as high-level target data, medium-level target data, low-level target data, or data that is not target data. Yet in another example, the rules-based model, machine-learning model, or combination thereof may provide output identifying the actual data associated with the particular element, field, and/or the like such as first name, last name, home address, social security number, age, gender, race, and/or the like. For example, the rules-based model and/or machine-learning model may provide the output in the form of a feature representation, such as a feature vector, in which each element found in the feature representation represents a specific type of target data and the value of each element identifies the likelihood of the particular element, field, and/or the like of being that specific type of target data. The rules-based model and/or machine-learning model may also determine and provide a confidence score in identifying the type of data along with the output.

Figure 5:
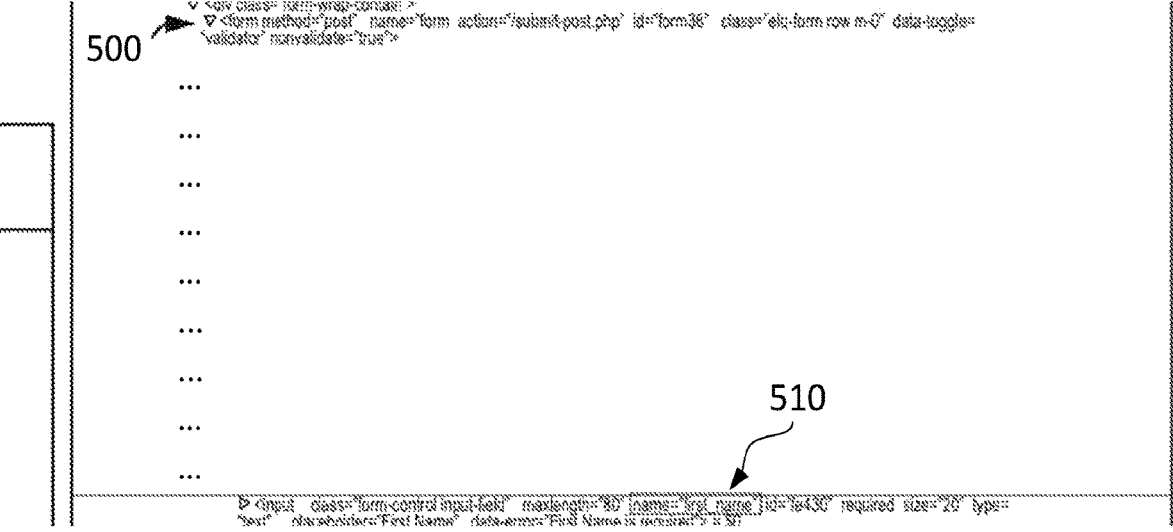
FIG. 5 illustrates an exemplary graphical user interface containing HTML data that may be processed according to various aspects of the present disclosure.

For instance, briefly turning to FIG. 5, this figure illustrates the HTML, and metadata of an example website. Here, the webform "validator" 500 may be identified for the website and an input field may be identified as being displayed on the webform having a name of the field as "first name" 510. Accordingly, the rules-based model and/or machine-learning model may process the metadata for the input field and provide output identifying that the type of data associated with the field "first name" 510 is the first name of a user who is providing input to the webform. Further, the output may provide a confidence score with respect to the identified type of data and/or indicate this particular type of data represents a type of target data.

The data type determination process 130 continues with determining whether there is another element, field, and/or the like associated with the functionality at Step 420. If so, then the data type determination process 130 involves returning to Step 410, selecting the next element, field, and/or the like, and identifying the data type associated with the newly selected element, field, and/or the like. The data type determination process 130 concludes with saving the identified type(s) of data at Step 425. As previously discussed, the risk determination process 120 according to various aspects involves using the type(s) of data associated with the functionality in determining a risk associated with the functionality's use of the target data.

Location Determination

Figure 6:
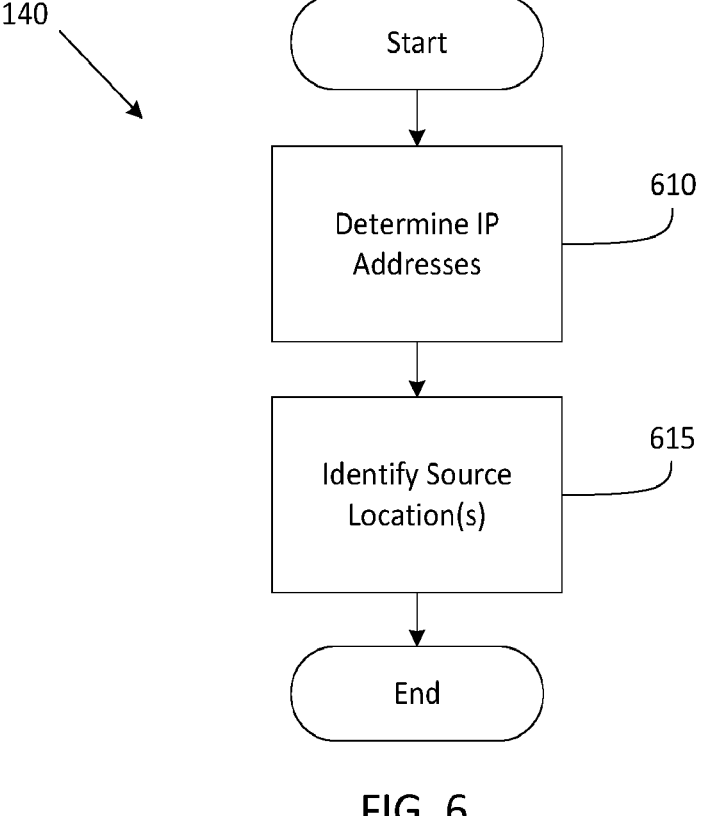
FIG. 6 is a flowchart of a process for identifying locations associated with transfers of target data in accordance with various aspects of the present disclosure.

Turning now to FIG. 6, additional details are provided regarding a location determination process 140 for determining one or more locations associated with functionality's use of target data in accordance with various aspects of the disclosure. For instance, the one or more locations may be associated with locations to which the functionality transfers and/or receives target data or at which a computing entity such as a server is located that calls, loads, executes, and/or the like the functionality. Accordingly, the process 140 may be implemented according to various aspects as suitable program code executed on, for example, computing hardware found in the risk analysis computing system 100 as described herein.

The location determination process 140 involves, at Step 610, determining one or more IP addresses associated with the determined vendor(s), service(s), system(s), and/or the like for the functionality. To accomplish this, the location determination process 140 according to various aspects involves initiating a series of activations of the functionality (e.g., the webform) from multiple systems located in various geographical locations and analyzing the resulting communications between the functionality and any remote systems.

Activating the functionality from the different geographical locations may cause the functionality to attempt to connect to the associated URLs from each of these geographical locations. Accordingly, the location determination process 140 involves analyzing the resulting traffic to determine the source and destination addresses (e.g., IP addresses) of such data communications at Step 615. For example, using the identified addresses, a geographical or jurisdictional location for the remote system may be determined by performing a reverse IP address look-up.

Example Technical Platforms

Aspects of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

According to various aspects, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

According to various aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, aspects of the present disclosure may take the form of a data structure, apparatus, system, computing device, computing entity, and/or the like executing instructions stored on a computer-readable storage medium to perform certain steps or operations. Thus, aspects of the present disclosure also may take the form of an entirely hardware aspect, an entirely computer program product aspect, and/or an aspect that comprises combination of computer program products and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 7:
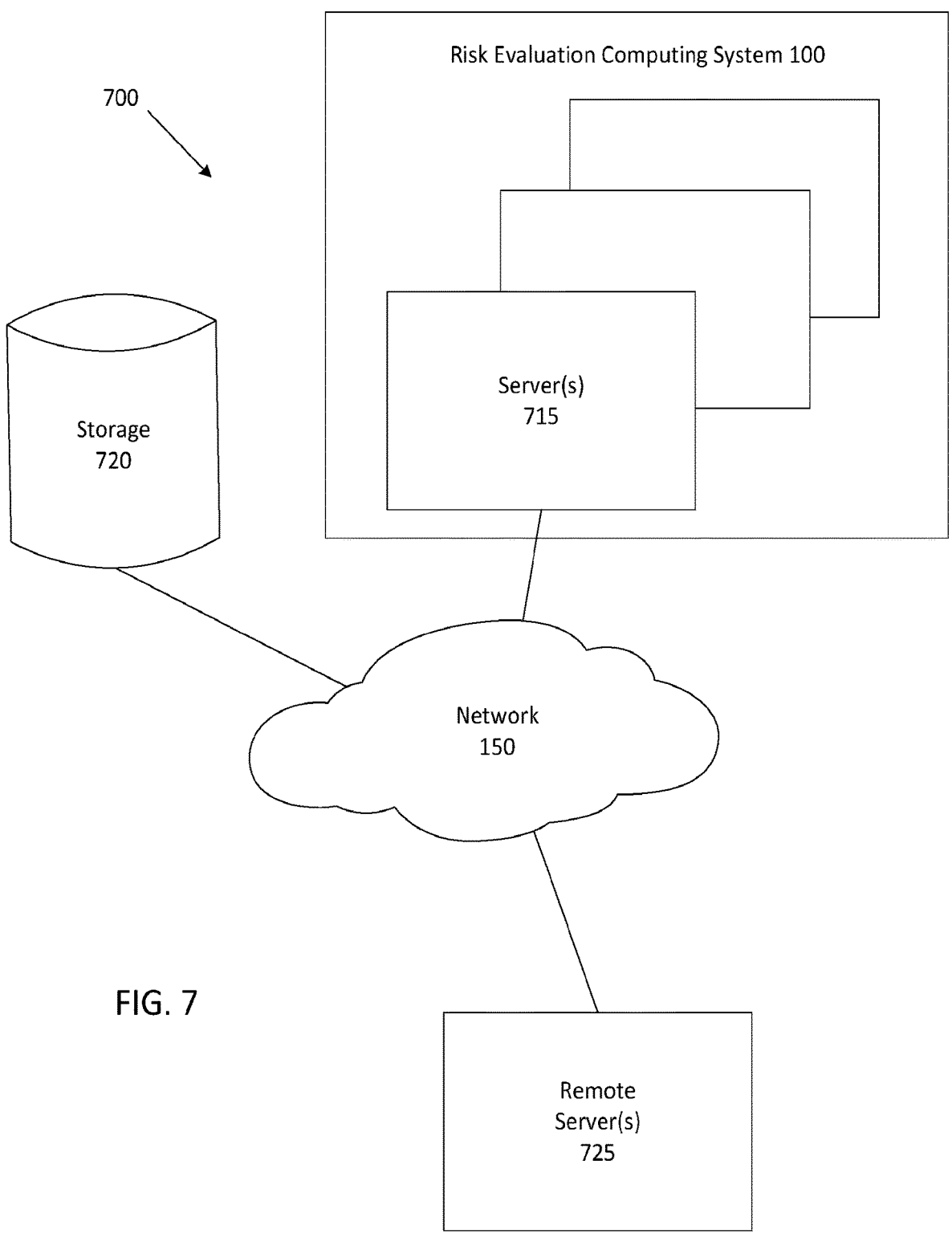
FIG. 7 is a block diagram illustrating an exemplary system architecture that may be used in accordance with various aspects of the present disclosure.

FIG. 7 is a block diagram of an example system architecture 700 that may be used in accordance to various aspects of the disclosure. According to various aspects, the architecture 700 associated with a particular organization and be configured to aid in evaluating software applications with respect to the risk associated with their use of target data. As may be understood from FIG. 7, the system architecture 700 includes a risk determination system 100 that comprises one or more servers 715 for carrying out the processes described herein for conducting the risk evaluation process 110, risk determination process 120, the data type determination process 130, and the location determination process 140 as detailed herein. In addition, the system architecture 700 may include one or more storage devices 720. Here, the storage devices 620 may located within or outside (as shown) of the risk determination system 100 and may be used in storing the software applications that are evaluated. In addition, the storage devices 720 may store various rules used within rules-based models as described herein.

The system architecture 700 may include one or more computer networks 150 that facilitate communication between the one or more servers 715 and the storage devices 720, as well as one or more remote servers 725 to which target data may be transferred. In addition, the one or more computer networks 150 may be used for downloading or accessing a software application that is to be analyzed. For example, the software application may reside in a third-party computing system 160 and/or third-party storage 180 (not shown in FIG. 7) from which the software application is upload to or access by the risk evaluation system 100. Here, the one or more computer networks 150 may include any of a variety of types of wired or wireless computer networks such as the Internet, a private intranet, a public switched telephone network (PSTN), or any other type of network. Accordingly, the communication link between the one or more servers 715, storage devices 720, and/or remote servers 725 may be, for example, implemented via a Local Area Network (LAN), a Wide Area Network (WAN), the Internet, and/or the like.

In various aspects, any of the servers 715, 725 may comprise a single server, a plurality of servers, one or more cloud-based servers, or any other suitable configuration. In addition, the storage devices 720 may be stored either fully or partially on any suitable server or combination of servers described herein. Further, the one or more servers 715 and/or the storage devices 720 may be physically located in a same (e.g., central) location, such as, for example, the headquarters of the particular organization, or in separate locations.

Example Computing Entity

Figure 8:
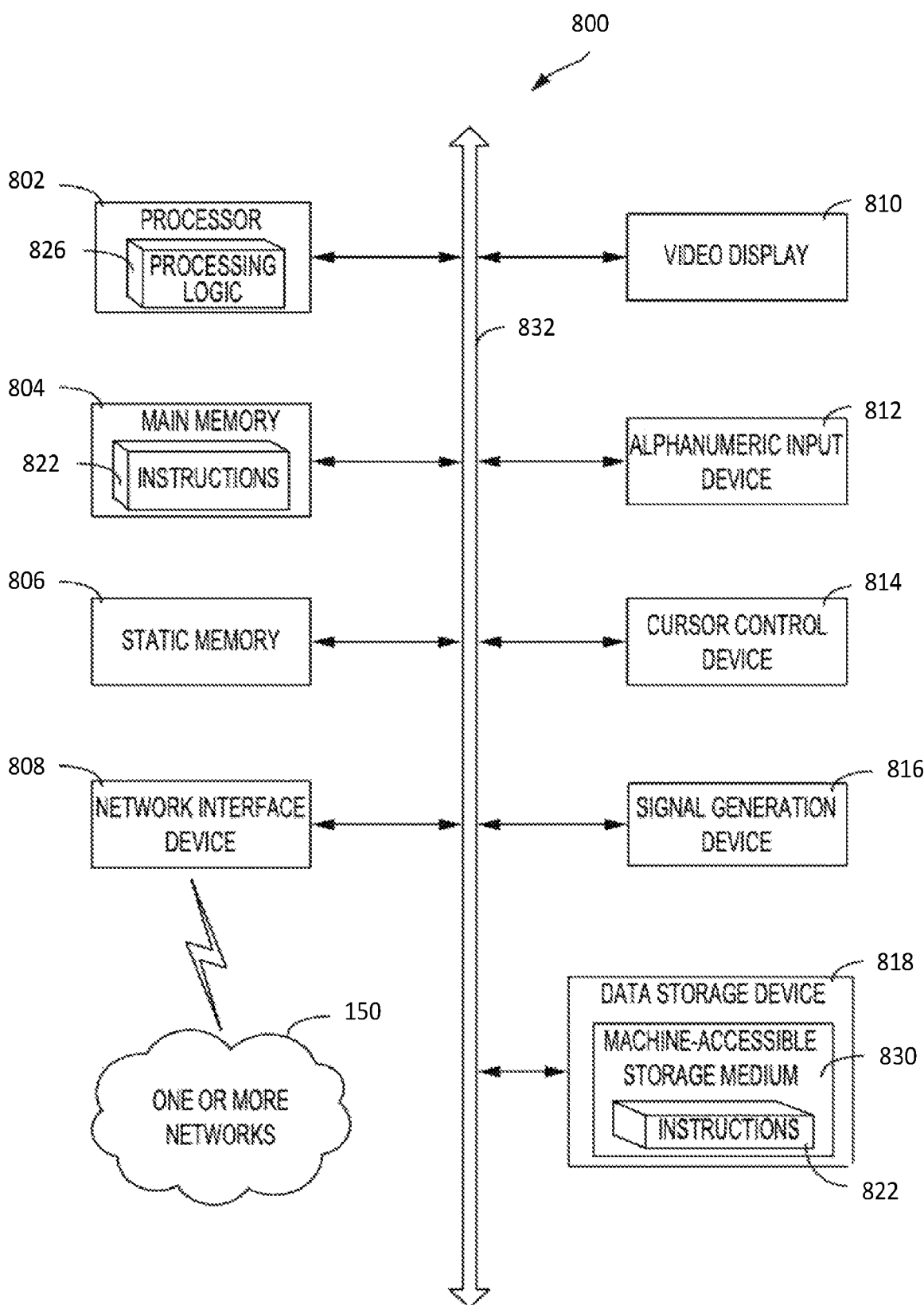
FIG. 8 is a schematic diagram of a computing entity that may be used in accordance with various aspects of the present disclosure.

FIG. 8 illustrates a diagrammatic representation of an example computing entity 800 that may be used in accordance with various aspects of the disclosure. For example, the computing entity 800 may be computing hardware such as the one or more servers 715 as described in FIG. 7. In particular aspects, the computing entity 800 may be connected (e.g., networked) to one or more other computing entities, storage devices, and/or the like via one or more networks such as, for example, a LAN, a WAN, and/or the Internet. As noted above, the computing entity 800 may operate in the capacity of a server and/or a client device in a client-server network environment, or as a peer computing device in a peer-to-peer (or distributed) network environment. According to various aspects, the computing entity 800 may be, for example, a personal computer (PC), a laptop computer, a web appliance, a server, a network router, a switch or bridge, or any other device capable of executing a set of instructions (sequential or otherwise) that specify actions to be taken by that device. Further, while only a single computing entity 800 is illustrated, the term "computing entity" shall also be taken to include any collection of computing entities that individually or jointly execute a set (or multiple sets) of instructions to perform any one or more of the methodologies discussed herein.

An exemplary computing entity 800 includes a processor 802, a main memory 804 (e.g., read-only memory (ROM), flash memory, dynamic random-access memory (DRAM) such as synchronous DRAM (SDRAM), Rambus DRAM (RDRAM), and/or the like), a static memory 806 (e.g., flash memory, static random-access memory (SRAM), and/or the like), and a data storage device 818, that communicate with each other via a bus 832.

The processor 802 may represent one or more general-purpose processing devices such as a microprocessor, a central processing unit, and/or the like. According to some aspects, the processor 802 may be a complex instruction set computing (CISC) microprocessor, reduced instruction set computing (RISC) microprocessor, very long instruction word (VLIW) microprocessor, processor implementing other instruction sets, processors implementing a combination of instruction sets, and/or the like. According to some aspects, the processor 802 may be one or more special-purpose processing devices such as an application specific integrated circuit (ASIC), a field programmable gate array (FPGA), a digital signal processor (DSP), network processor, and/or the like. The processor 802 may be configured to execute processing logic 826 for performing various operations and/or steps described herein.

The computing entity 800 may further include a network interface device 808, as well as a video display unit 810 (e.g., a liquid crystal display (LCD), a cathode ray tube (CRT), and/or the like), an alphanumeric input device 812 (e.g., a keyboard), a cursor control device 814 (e.g., a mouse), and/or a signal generation device 816 (e.g., a speaker). The computing entity 800 may further include a data storage device 818. The data storage device 818 may include a non-transitory computer-readable storage medium 830 (also known as a non-transitory computer-readable storage medium or a non-transitory computer-readable medium) on which is stored one or more sets of instructions 822 (e.g., software, software modules) embodying any one or more of the methodologies or functions described herein. The instructions 822 may also reside, completely or at least partially, within main memory 804 and/or within the processor 802 during execution thereof by the computing entity 800—main memory 804 and processor 802 also constituting computer-accessible storage media. The instructions 822 may further be transmitted or received over a network 150 via the network interface device 808.

While the computer-readable storage medium 830 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the computing entity 800 and that causes the computing entity 800 to perform any one or more of the methodologies of the present disclosure. The term "computer-readable storage medium" should accordingly be understood to include, but not be limited to, solid-state memories, optical and magnetic media, and/or the like.

Exemplary System Operation

The logical steps described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical steps described herein are referred to variously as states, operations, steps, structural devices, acts, or modules. These operations, steps, structural devices, acts, and modules may be implemented in software, in firmware, in special purpose digital logic, and any combination thereof. Greater or fewer steps may be performed than shown in the figures and described herein. These steps may also be performed in a different order than those described herein.

CONCLUSION

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may generally be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

We claim:

1. A method comprising:

identifying, by computing hardware, a field associated with functionality of a software application configured for processing target data by:

comparing a first plurality of fields in a first version of the functionality with a second plurality of fields in a second version of the functionality; and determining that the field corresponds to a new field added to the second version of the functionality relative to the first version of the functionality;

identifying, by the computing hardware, a type of data associated with the field;

having a series of activations of the functionality performed by the computing hardware, wherein the series of activations originates from a plurality of computing systems found in a plurality of remote locations;

analyzing, by the computing hardware, communications resulting from the series of activations to identify at least one of a source or a destination of at least one communication of the communications, the at least one communication comprising data of the field;

determining, by the computing hardware and based on the type of data and at least one of the source or the destination of the at least one communication comprising data of the field, a risk associated with the functionality processing the target data, wherein determining the risk comprises:

determining a first risk associated with the first version of the functionality identified by activating the functionality according to the first plurality of fields;

determining a second risk associated with the second version of the functionality identified by activating the functionality according to the second plurality of fields; and determining the risk from the second risk based on the second risk being greater than the first risk;

determining, by the computing hardware, that the risk satisfies a threshold level of risk; and responsive to determining that the risk satisfies the threshold level of risk, causing, by the computing hardware, an action to be performed to mitigate the risk, wherein the action comprises at least one of causing the software application to become unavailable, generating an electronic communication sent to personnel identifying the functionality and the risk, or disabling the functionality in the software application.

2. The method of claim 1 further comprising determining, by the computing hardware and based on at least one of the functionality or the type of data for the field, the threshold level of risk.

3. The method of claim 1, wherein analyzing communications resulting from the series of activations comprises:

identifying a first destination of at least one communication of the communications, the at least one communication comprising data of the field;

identifying a second destination of at least one communication of the communications, the at least one communication not comprising data of the field; and determining the first destination is not equivalent to the second destination.

4. The method of claim 1, wherein the risk comprises at least one of a risk of experiencing a data privacy incident due to the functionality processing the target data or a risk of being noncompliant with a data privacy standard due to the functionality processing the target data.

5. The method of claim 1, wherein the software application comprises a website and the functionality comprises a webform found on the website in which the field is used on the webform to collect the target data.

6. The method of claim 1, wherein the software application comprises a mobile application and the functionality comprises a graphical user interface provided through the mobile application in which the field is used on the graphical user interface to collect the target data.

7. The method of claim 1, wherein determining the risk associated with the functionality processing the target data involves using at least one of a rules-based model or a machine learning model to generate the risk, and the risk represents a likelihood of experiencing at least one of a data privacy incident due to the functionality processing the target data or being noncompliant with a data privacy standard due to the functionality processing the target data.

8. A system comprising:

a non-transitory computer-readable medium storing instructions; and a processing device communicatively coupled to the non-transitory computer-readable medium, wherein, the processing device is configured to execute the instructions and thereby perform operations comprising:

identifying a field associated with functionality of a software application configured for processing target data by:

comparing a first plurality of fields in a first version of the functionality with a second plurality of fields in a second version of the functionality; and determining that the field corresponds to a new field added to the second version of the functionality relative to the first version of the functionality;

identifying a type of data associated with the field;

having a series of activations of the functionality performed, wherein the series of activations originates from a plurality of computing systems found in a plurality of remote locations;

analyzing communications resulting from the series of activations to identify at least one of a source or a destination of at least one communication of the communications, the at least one communication comprising data of the field;

determining, based on the type of data and at least one of the source or the destination of the at least one communication comprising data of the field, a risk associated with the functionality processing the target data, wherein determining the risk comprises:

determining a first risk associated with the first version of the functionality identified by activating the functionality according to the first plurality of fields;

determining a second risk associated with the second version of the functionality identified by activating the functionality according to the second plurality of fields; and determining the risk from the second risk based on the second risk being greater than the first risk; and causing an action to be performed to mitigate the risk, wherein the action comprises at least one of causing the software application to become unavailable, generating an electronic communication sent to personnel identifying the functionality and the risk, or disabling the functionality in the software application.

9. The system of claim 8, wherein analyzing communications resulting from the series of activations comprises:

identifying a first destination of at least one communication of the communications, the at least one communication comprising data of the field;

identifying a second destination of at least one communication of the communications, the at least one communication not comprising data of the field; and determining the first destination is not equivalent to the second destination.

10. The system of claim 8, wherein the risk comprises at least one of a risk of experiencing a data privacy incident due to the functionality processing the target data or a risk of being noncompliant with a data privacy standard due to the functionality processing the target data.

11. The system of claim 8, wherein the software application comprises a website and the functionality is provided through the website.

12. The system of claim 8, wherein the software application comprises a mobile application and the functionality is provided through the mobile application.

13. The system of claim 8, wherein determining the risk associated with the functionality processing the target data involves using at least one of a rules-based model or a machine learning model to generate the risk, and the risk represents a likelihood of experiencing at least one of a data privacy incident due to the functionality processing the target data or being noncompliant with a data privacy standard due to the functionality processing the target data.

14. A non-transitory computer-readable medium having program code that is stored thereon, the program code executable by one or more processing devices for performing operations comprising:

identifying a first plurality of fields in a first version of a functionality of a software application configured for processing target data;

comparing the first plurality of fields in the first version of the functionality with a second plurality of fields in a second version of the functionality;

determining that a field of the second plurality of fields is a new field added to the second version of the functionality relative to the first version of the functionality;

having a series of activations of the functionality performed, wherein the series of activations originates from a plurality of computing systems found in a plurality of remote locations;

analyzing communications resulting from the series of activations to identify at least one of a source or a destination of at least one communication of the communications, the at least one communication comprising data of the field;

determining, based on at least one of the source or the destination of the at least one communication comprising data of the field, a risk associated with the functionality processing the target data, wherein determining the risk comprises:

determining a first risk associated with the first version of the functionality identified by activating the functionality according to the first plurality of fields;

determining a second risk associated with the second version of the functionality identified by activating the functionality according to the second plurality of fields; and determining the risk from the second risk based on the second risk being greater than the first risk;

determining that the risk satisfies a threshold level of risk; and responsive to determining that the risk satisfies the threshold level of risk, causing an action to be performed to mitigate the risk, wherein the action comprises at least one of causing the software application to become unavailable, generating an electronic communication sent to personnel identifying the functionality and the risk, or disabling the functionality in the software application.

15. The non-transitory computer-readable medium of claim 14, wherein the operations further comprise determining, based on the functionality, the threshold level of risk.

16. The non-transitory computer-readable medium of claim 14, wherein the operations further comprise:

comparing a first version of the software application with a second version of the software application; and identifying the functionality is found in the second version of the software application, but the functionality is not found in the first version of the software application.

17. The non-transitory computer-readable medium of claim 14, wherein the risk comprises at least one of a risk of experiencing a data privacy incident due to the functionality processing the target data or a risk of being noncompliant with a data privacy standard due to the functionality processing the target data.

18. The non-transitory computer-readable medium of claim 14, wherein the software application comprises a website and the functionality through the website.

19. The non-transitory computer-readable medium of claim 14, wherein the software application comprises a mobile application and the functionality is provided through the mobile application.

20. The non-transitory computer-readable medium of claim 14, wherein determining the risk associated with the functionality processing the target data involves using at least one of a rules-based model or a machine learning model to generate the risk, and the risk represents a likelihood of experiencing at least one of a data privacy incident due to the functionality processing the target data or being noncompliant with a data privacy standard due to the functionality processing the target data.

* * * * *